(12) United States Patent
Singh et al.

(10) Patent No.: US 11,930,082 B1
(45) Date of Patent: Mar. 12, 2024

(54) MULTIPLE ZONE COMMUNICATIONS AND CONTROLS

(71) Applicant: Amazon Technologies, Inc., Seattle, WA (US)

(72) Inventors: Amandeep Singh, Issaquah, WA (US); Ravi Kumar Alamanda, Cedar Park, TX (US); Monish Nagisetty, Lewis Center, OH (US); Michele Mixter, Los Altos Hills, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/082,340

(22) Filed: Dec. 15, 2022

(51) Int. Cl.
| | |
|---|---|
| *H04L 67/141* | (2022.01) |
| *G06F 3/0482* | (2013.01) |
| *G06F 3/14* | (2006.01) |
| *G06F 3/16* | (2006.01) |
| *G10L 15/22* | (2006.01) |
| *H04R 1/02* | (2006.01) |
| *H04R 1/40* | (2006.01) |
| *H04R 3/00* | (2006.01) |
| *H04R 3/12* | (2006.01) |

(52) U.S. Cl.
CPC .......... *H04L 67/141* (2013.01); *G06F 3/0482* (2013.01); *G06F 3/1423* (2013.01); *G06F 3/165* (2013.01); *G06F 3/167* (2013.01); *G10L 15/22* (2013.01); *H04R 1/025* (2013.01); *H04R 1/403* (2013.01); *H04R 1/406* (2013.01); *H04R 3/005* (2013.01); *H04R 3/12* (2013.01); *G10L 2015/223* (2013.01); *H04R 2201/401* (2013.01); *H04R 2499/13* (2013.01)

(58) Field of Classification Search
CPC ... H04L 67/141; G06F 3/0482; G06F 3/1423; G06F 3/165; G06F 3/167; G10L 15/22; G10L 2015/223; H04R 1/025; H04R 1/403; H04R 1/406; H04R 3/005; H04R 3/12; H04R 2201/401; H04R 2499/13
See application file for complete search history.

(56) References Cited

U.S. PATENT DOCUMENTS

| | | |
|---|---|---|
| 7,571,014 B1 | 8/2009 | Lambourne et al. |
| 9,142,071 B2 | 9/2015 | Ricci |

(Continued)

OTHER PUBLICATIONS

"Audio HAL," Android Open Source Project, Available Online at: https://source.android.com/devices/audio/implement, Accessed from Internet on Dec. 20, 2022, 8 pages.

(Continued)

*Primary Examiner* — Sargon N Nano
(74) *Attorney, Agent, or Firm* — Kilpatrick Townsend & Stockton LLP

(57) ABSTRACT

Techniques for communications in a multi-zone space are described. In an example, a system stores data indicating devices in zones of a space and data indicating zones that are associated with a communications session. A display in a zone presents graphical user interface indicating the zones associated with the communications session. Incoming audio data can be mixed with audio data detected from another participating zone and a speaker in the zone can output this audio data. Audio data detected from the participating zone can also be mixed and sent to a remote device that is an endpoint of the communications session.

20 Claims, 16 Drawing Sheets

(56) References Cited

U.S. PATENT DOCUMENTS

| | | | |
|---|---|---|---|
| 9,502,050 B2* | 11/2016 | Buck | H04R 1/00 |
| 10,560,795 B1* | 2/2020 | Kim | H04S 7/303 |
| 2002/0124097 A1 | 9/2002 | Isely et al. | |
| 2005/0138662 A1 | 6/2005 | Seto | |
| 2006/0044214 A1 | 3/2006 | Hong | |
| 2006/0155429 A1 | 7/2006 | Boone et al. | |
| 2009/0146912 A1 | 6/2009 | Hiramatsu et al. | |
| 2009/0195712 A1 | 8/2009 | Strohmaier | |
| 2010/0333146 A1 | 12/2010 | Pickney et al. | |
| 2011/0169755 A1 | 7/2011 | Murphy et al. | |
| 2011/0289224 A1 | 11/2011 | Trott | |
| 2012/0026409 A1 | 2/2012 | Higuchi et al. | |
| 2012/0197637 A1* | 8/2012 | Gratke | G10L 21/02 704/226 |
| 2014/0074480 A1 | 3/2014 | Gratke et al. | |
| 2014/0309875 A1 | 10/2014 | Ricci | |
| 2017/0213541 A1* | 7/2017 | MacNeille | G10K 11/17881 |
| 2017/0323639 A1* | 11/2017 | Tzirkel-Hancock | B60H 1/00757 |
| 2017/0329329 A1* | 11/2017 | Kamhi | B60W 50/0098 |
| 2018/0024725 A1 | 1/2018 | Penilla et al. | |
| 2018/0190282 A1 | 7/2018 | Mohammad et al. | |
| 2019/0069251 A1* | 2/2019 | Wang | H04W 52/18 |
| 2020/0219493 A1* | 7/2020 | Li | H04R 3/005 |
| 2021/0092522 A1* | 3/2021 | Draper | B60R 11/0264 |
| 2021/0291619 A1 | 9/2021 | Aghniaey et al. | |
| 2022/0068253 A1* | 3/2022 | Pignier | G10K 11/17881 |
| 2022/0194389 A1* | 6/2022 | Kim | B60W 40/08 |
| 2023/0088236 A1* | 3/2023 | Medin | B64D 11/00 725/76 |
| 2023/0325146 A1* | 10/2023 | Mistry | G06F 3/167 715/706 |

OTHER PUBLICATIONS

"Automotive Audio," Android Open Source Project, Available Online at: https://source.android.com/docs/devices/automotive/audio#multi-zone, Accessed from Internet on Dec. 19, 2022, 9 pages.

"BlackBerry, Google, and Qualcomm Join Forces to Drive Advancements in Next-Generation Automotive Cockpits," Corporate Communications, Available Online at: https://blogs.blackberry.com/en/2021/10/blackberry-google-and-qualcomm-join-forces-to-drive-advancements-in-next-generation-automotive-cockpits, Oct. 12, 2021, 2 pages.

"Communication," Alexa, Available Online at: https://developer.amazon.com/en-US/docs/alexa/alexa-auto/communication.html, 13 pages.

Cunningham, "Harman Creates Personal Audio Zones for your Car," CNET, Available Online at: https://www.cnet.com/roadshow/news/harman-creates-personal-audio-zones-for-ces-2015/, Jan. 5, 2015, 2 pages.

"New Acoustic Innovations from HARMAN Bring the Whole Family Together with Easy to Use, Integrated and Upgradable In-Vehicle Experiences," Harman, Available Online at: https://news.harman.com/releases/new-acoustic-innovations-from-harman-bring-the-whole-family-together-with-easy-to-use-integrated-and-upgradable-in-vehicle-experiences, Feb. 10, 2022, 4 pages.

"OpenSynergy Collaborates with Google and Qualcomm," Open Synergy, Available Online at: https://www.opensynergy.com/opensynergy-collaborates-with-google-and-qualcomm/, Jul. 7, 2020, 1 page.

"QNX Acoustics Management Platform", Blackberry, QNX, Available Online at: https://blackberry.qnx.com/en/software-solutions/automotive/qnx-acoustics-management-platform, 7 pages.

"QNX Neutrino Real-time Operating System," Blackberry Available Online at: https://blackberry.qnx.com/en/software-solutions/embedded-software/qnx-neutrino-rtos, 2022, 7 pages.

"QNX Platform for Digital Cockpits," Product Brief, Available Online at: https://blackberry.qnx.com/content/dam/qnx/products/bts-digital-cockpits-product-brief.pdf, 2019, 4 pages.

"Qualcomm Revolutionizes the Digital Cockpit With 4th Generation Snapdragon Automotive Cockpit Platforms," 4th Generation Automotive Cockpit Platforms Usher in New Era of Enhanced, Premium Driving Experiences for Next Generation Vehicles, Jan. 26, 2021, 8 pages.

"Virtual I/O Device (VIRTIO) Version 1.0," OASIS, Committee Specification 04, Available Online at: https://docs.oasis-open.org/virtio/virtio/v1.0/virtio-v1.0.html, Mar. 3, 2016, 95 pages.

Singh et al., U.S. Appl. No. 18/082,754, "Multi-Zone Content Output Controls," filed Dec. 16, 2022, 112 pages.

* cited by examiner

MULTIPLE ZONE COMMUNICATIONS AND CONTROLS

BACKGROUND

Communications can be established between endpoints, such as mobile devices and/or other devices executing communication applications. In certain implementations, multiple endpoints can be installed in a same space. In such implementations, it may be desired to enable communications with an endpoint located outside of the space, where the multiple endpoints installed in the space can also participate in the communications.

BRIEF DESCRIPTION OF THE DRAWINGS

Various embodiments in accordance with the present disclosure will be described with reference to the drawings, in which.

DETAILED DESCRIPTION

Figure 1:
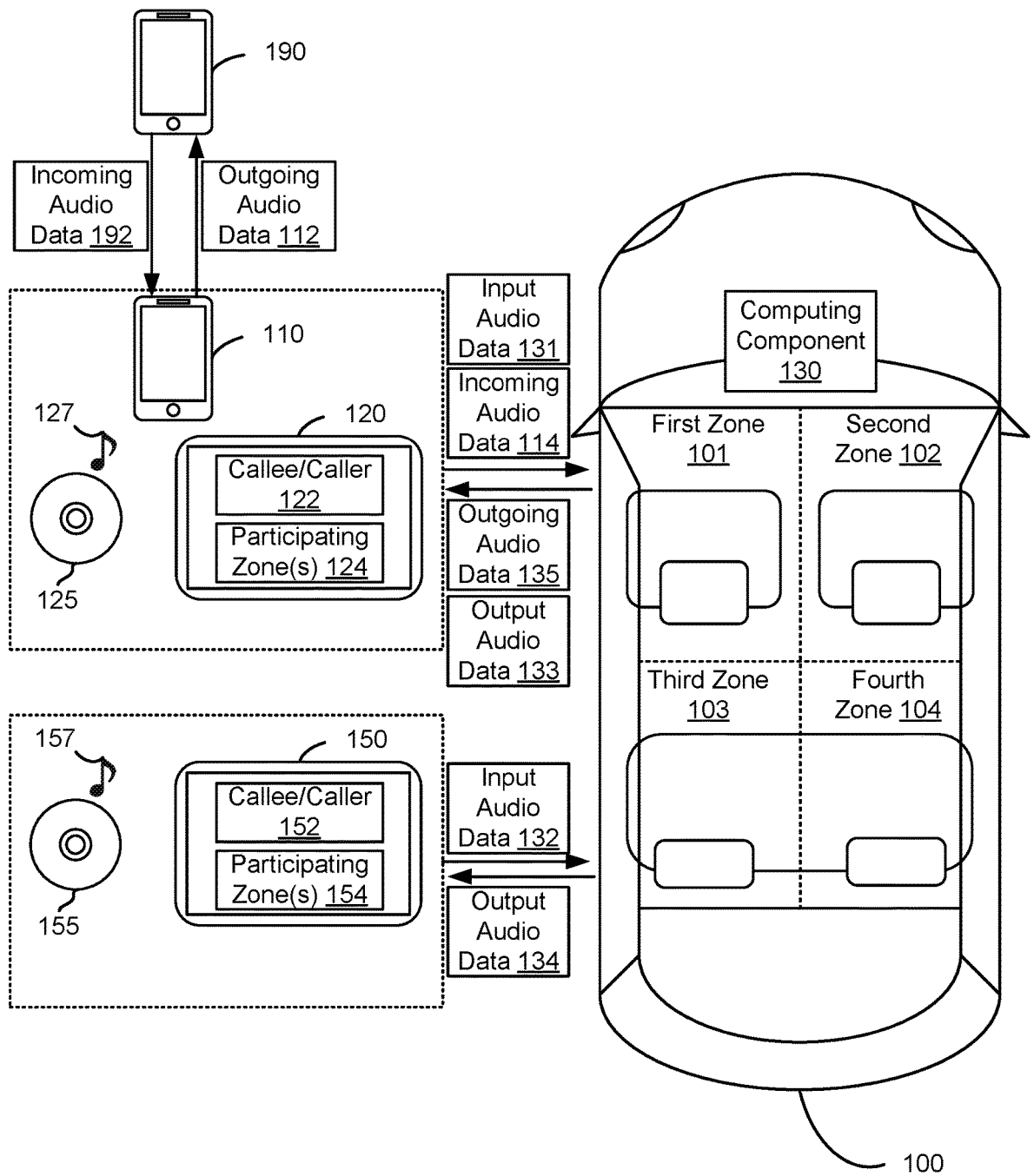
FIG. 1 illustrates an example of multiple zones in a vehicle and related communications, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, facilitating a communications session between a device located outside of a vehicle and devices that are associated with a zone of the vehicle. In an example, the vehicle includes multiple speakers, displays, and a computing component. The speakers and the displays can be associated with multiple zones of the vehicle's cabin. A zone can represent a grouping (logical or physical) of devices that are installed within the vehicle, where the grouping can be referred to with a zone identifier and used as an endpoint of a communications session. In the case of a logical group, the association of devices with the zone may dynamically change (e.g., the zone may initially be associated with a display and a speaker installed by the driver seat to subsequently be additionally associated with a display and a speaker installed by the front passenger seat). An example of a multiple zone configuration includes a driver zone, a front passenger zone, a rear right passenger zone, and a rear left passenger zone. Each of such zones is associated with at least one speaker and one display. Optionally, each zone is associated with a microphone. Alternatively or additionally, a microphone array can be installed in the vehicle and can support audio beamforming technology. Furthermore, a device interface (e.g., a Bluetooth connectivity chip) can be associated with a zone to enable a data connection with a device (e.g., a Bluetooth link established by following a pairing procedure). In this case, the device can also be associated with the zone. When a communications session is established and uses the zone identifiers, the devices associated with the zone can be used for receiving data inputs and providing data outputs. For example, when these devices include a display, a speaker, and a set of microphones, text and/or graphical data can be output by the display, incoming audio data can be output by the speaker, and outgoing audio data can be received by the set of microphones).

A computing component can facilitate establishment of a communications session can between a first zone of the vehicle (where a first display associated with the first zone can present information about the communications session, a first speaker associated with the first zone can output incoming audio data, and a first set of microphones associated with the first zone can generate outgoing audio data) and a second endpoint located outside of the vehicle. In an example, the computing component can store zone operational data indicating that the first zone is associated with the communications session. A second zone of the vehicle can be added to the communications session (such that where a second display associated with the second zone can present information about the communications session, a second speaker associated with the first zone can output the incoming audio data, and a second set of microphones associated with the second zone can generate outgoing audio data). The computing component can update the zone operational data to further indicate that the second zone is associated with the communications session. The computing component also causes the first display associated with the first zone to indicate that the second zone was added and causes a second display associated with the second zone to indicate that it was added to the communications session by the first zone.

The computing component also provides various audio processing functions. For example, incoming audio data of the endpoint located outside of the vehicle is received. Further, first outgoing audio data associated with the first zone (e.g., generated by a first microphone associated with the zone or generated by the microphone array and indicated as being detected from the first zone) is also received. Similarly, second outgoing audio data associated with the second zone is received. The computing component can generate first audio data by mixing the incoming audio data and the second outgoing audio data. This first audio data can be output by a first speaker within the first zone. Similarly, the computing component can generate second audio data by mixing the incoming audio data and the first outgoing audio data. This second audio data can be data also being sent for output by the second speaker associated with the second zone. Further, the computing component can generate third outgoing audio data by mixing the first outgoing data and the second outgoing audio data. The third outgoing audio data can be sent to the endpoint located outside of the vehicle.

To illustrate, consider an example of an incoming phone call to a vehicle. In this example, a mobile device is paired with a Bluetooth connectivity chip in a driver zone of the vehicle. The mobile device is a recipient of the phone call, whereas the caller device is located outside of the vehicle. A first display associated with the driver zone includes a first graphical user interface (GUI) indicating that the phone call is ongoing and identifying the caller. The GUI also includes a GUI component providing an option to add a rear right passenger zone of the vehicle to the phone call. Upon a selection of this option, the rear right passenger zone becomes a participant in the phone call. In particular, a computing component of the vehicle stores zone configuration data that associates the mobile device, the first display, and a first speaker with a first zone identifier of the driver zone. The zone configuration data also associates a second display and a second speaker with a second zone identifier of the rear right passenger zone. The computing component also stores zone operational data that associates the first zone identifier and the second zone identifier with a session identifier of the phone call. Incoming audio data is received by the mobile device and sent to the computing component via the Bluetooth connectivity chip. First outgoing audio data is generated by a microphone array of the vehicle and corresponds to first natural language speech detected to have a beam direction such that spoken audio from the driver zone is easiest to hear. Second outgoing audio data is also generated by the microphone array and corresponds to second natural language speech detected to have a beam direction corresponding to the rear right passenger zone. The computing component receives the first outgoing audio data and the second outgoing audio data from the microphone array and associates them with the first zone and the second zone based on associated beam directionalities. Based on the zone operational data indicating that the second zone is associated with the phone call, the computing component mixes the incoming audio data and the first outgoing audio data and associates the resulting audio data with the second zone identifier. Based on the zone configuration data indicating that the second speaker is associated with the second zone, the computing component sends the resulting audio data to the second speaker for output. Similarly, the computing component mixes the incoming audio data and the second outgoing audio data and sends the resulting audio data to the first speaker. Further, the computing component mixes the first outgoing audio data and the second outgoing audio data and the resulting audio data is sent, e.g., via the Bluetooth connectivity chip, to the mobile device that then sends it to the caller device.

In the interest of clarity of explanation, various embodiments of the present disclosure are described in connection with zones of a vehicle, using Bluetooth, etc. However, the embodiments are not limited as such. Instead, the embodiments similarly and equivalently apply to any space that includes a computing component (or some other computing component) and endpoints, where such endpoints are communicatively coupled with the computing component and can be physically and/or logically grouped in multiple zones. Such a space can be in an aircraft, ground craft, watercraft, or in a stationary structure (e.g., a house, a school, an office, a hotel, a shopping establishment/mall, a theater, etc.). Further, various embodiments of the present disclosure are described in connection with two zones that are participant in a phone call. However, the embodiments are not limited as such. Instead, the embodiments similarly and equivalently apply to any number of zones and to any type of communications sessions. A communications session can be synchronous or asynchronous and can be established to send and/or receive audio data (e.g., voice), audio and/ video data (e.g., teleconferencing), text data (e.g., messaging), or other data (e.g., document files for document collaboration across multiple zones).

FIG. 1 illustrates an example of multiple zones in a vehicle 100 and related communications, according to embodiments of the present disclosure. As illustrated, the vehicle 100 includes four zones: a first zone 101, a second zone 102, a third zone 103, and a fourth zone 104, although a different zone configuration is possible. A mobile device 110 is located within the first zone 110 and communicatively coupled with a computing component 130 of the vehicle 100. A communications session corresponding to a phone call is established (e.g., over a cellular network and/or some other type of data network) between the mobile device 110 and another device 190 located outside of the vehicle 100. The first zone 101 and the third zone 103 are participants in the communications session. In particular, the computing component 130 associates the mobile device 110, a display 120 located in the first zone 101, and a speaker 125 located in the first zone 101 with the first zone 101, a display 150 located in the third zone 103, and a speaker 155 located in the third zone 103 with the third zone 103. The computing component 130 also associates the first zone 101 and the third zone 103 with the communications session. The computing component 130 also processes audio data of the communications session such that each of the speakers 125 and 155 outputs relevant audio in the respective zones 101 and 103, and such that the mobile device 110 sends relevant audio data to the device 190. Each of the displays 120 and 150 also indicate that the phone call is multi-zonal.

Generally, a zone can be a physical portion of a physical space, where the portion includes at least one endpoint, such as at least one speaker, at least one display, or a combination of at least one speaker and one display. A zone can also or alternatively be a logical group of devices located in a space, where the group corresponds to at least one speaker, at least one display, or a combination of at least one speaker and one display. In both situations (e.g., physical zone or logical zone), a zone can have a zone identifier that uniquely identifies the zone in the vehicle 100. The zone identifier can be associated in a data structure with a device identifier(s) of the device(s) of the zone. In an example, the data structure uses using key-value pairs, where the key includes the zone identifier, and the value includes a device identifier, such as speaker identifier of a speaker, a display identifier of a display, or any other device identifier of a device of the zone (e.g., the mobile device 110 in the first zone 101). The data structure stores configuration data that indicates the zone configuration of the vehicle 100 (e.g., the associations between zone identifiers and endpoint identifiers).

In the illustration of FIG. 1, the first zone 101 corresponds to a driver zone and includes the first display 120 and the first speaker 125. The mobile device 110 is also located in the first zone and communicatively coupled with the computing component 130 (e.g., via a vehicle interface, such as a Bluetooth connectivity chip, located in the first zone as further described in the next figures). As such, the first zone 101 has a first zone identifier that is associated with a first display identifier of the first display 120, a first speaker identifier of the first speaker 125, and a device identifier of the mobile device 110. Similarly, the third zone 103 corresponds to a rear left passenger zone and includes the second display 150 and the second speaker 155. Here, the third zone 103 has a second zone identifier that is associated with a second display identifier of the second display 150 and a second speaker identifier of the second speaker 155. As used herein, a device located, installed, or included in a zone refers to a device that is associated with the zone. In the case when the zone is a physical space, the device can be physically present within the physical space. In the case of a logical group, the device's identifier can be associated, in a data structure, with the zone's identifier.

The zone configuration of the vehicle 100 can be static. In other words, the configuration data can be pre-defined, and no changes thereto may be possible. Alternatively, the zone configuration of the vehicle 100 can be dynamic. In other words, the configuration data can be updated over time to change the zone configuration. For example, the first zone 101 and the second zone 102 can be grouped together to become a front zone. The configuration data can be updated to reflect this grouping such, as by including a zone identifier of the front zone and associating this zone identifier with the first zone identifier of the first zone 101 and the second zone identifier of the second zone 102 and/or with the endpoint identifiers of the endpoints of the first zone 101 and the second zone 102. The update can be triggered from the vehicle 100 (e.g., by using the display 120, the speaker 125, and/or any other device of the driver zone and/or an computing component 130). Additionally or alternatively, the update can be triggered by the original equipment manufacturer (OEM) or by an owner or operator of the vehicle 100 (e.g., in the case of a rental company or a ride share service company). The configuration data can be stored locally at the vehicle 100 (e.g., at the computing component 130) and/or remotely at a data store accessible to the computing component 130.

Different operational modes are possible including a multi-zone mode, an individual zone mode, and an output-only mode. In the interest of clarity of explanation, such modes are described herein in connection with the first zone 101 and the third zone 103 but can similarly and equivalently apply to the second zone 102, the fourth zone 104, and/or any combination of the four zones 101-104.

In the multi-zone mode, the first zone 101 and the third zone 103 are setup such that the same content experience is shared in these two zones 101 and 103. In an example, the content can be communications session content (e.g., audio data), whereby these two zones 101 and 103 are participants in the same communications session.

In the individual zone mode, the first zone 101 and the third zone 103 are setup such that a different individualized content experience is provided in each of the two zones 101 and 103. For example, in the use case of communications, each one of the zones 101 and 193 can be a participant in a different communications session.

In the output-only mode, a zone may be setup such that only a particular content experience (e.g., listen only) is provided. For example, the fourth zone 104 can be operated in the output-only mode, whereby music content can be selected from a different zone sent thereto from a content source for output. However, in this output-only mode, the fourth zone 104 may not select the music content and/or may not be a participant in a communications session.

Operational data can be stored (e.g., in the same data store or a different data store storing the configuration data) and indicate the operational mode(s) in use and the associated zone(s). The data store can be in the vehicle 100 or external to the vehicle 100. The operational data can include a mode identifier that uniquely identifies one of the three modes and a zone identifier(s) of the zone(s) to which the operational mode applies.

In addition, each zone can be associated with a status regarding content output. For example, the status of a zone can indicate whether music is being output in the zone, whether an ongoing communications session is associate with the zone, and/or any other status of an application that the computing component 130 can execute in association with the zone. Such status data can be included in the operational data.

The operational data can change over time. For example, a change from one operational mode to another operational mode can be triggered from one or more zones 101-104 (e.g., from the driver zone 101 by using the display 120, the speaker 125, and/or any other device of the driver zone 101) and/or via the computing component 130. The operational data in the data store to indicate the change. In another example, a change to the status of a zone can be reflected in the operational data (e.g., that the second zone 102 is associated with an ongoing communications session, that the fourth zone 103 is no associated with an ongoing communications session, etc.).

Each zone can be associated with a set of permissions related to content output. Generally, the set of permissions associated with a zone enable various controls over the content output in the zone and, possibly, in one or more other zones. The set of permissions can relate to any type or a particular type of communications session. For example, the first zone 101 can be associated with a full set of permissions enabling addition of other zones to a communications session, removal of other zones from a communications session, the muting of audio input from another zone participating in a communications session, the muting of audio output in another zone participating in a communications session, the termination of a communications session associates with multiple zones, and the like. In comparison, the third zone 103 may be associated with a limited set of permissions enabling only the third zone 103 to be a participant in a communications session associated with at least one other zone. Different factors can be used to setup the permissions per zone and/or across the zones.

One example factor is the operational mode in use in the zone. For example, in the multi-zone mode, one zone (e.g., the driver zone 101) can be designated as a primary zone, whereas the remaining zone(s) (e.g., the third zone 103) can be designated as a secondary zone. Such designations can be stored in the operational data by default or based on user input at an endpoint within the vehicle 100 or at a device external to the vehicle 100 such as via a mobile application on a mobile device that is securely communicatively coupled with the vehicle 100. The primary zone can be associated with the full set of permissions that enable controls over other zones. The secondary zone can be unassociated with the full set of permissions and, instead, associated with the limited set of permissions, In the individual zone mode, a zone to which this mode applies can be associated with full set permissions, except that the controls may not extend to controls over other zones. In the output-only mode, a zone to which this mode applies can be associated with third permissions that are even more limited in nature, whereby the zone may not participate in a multi-zonal communications session.

Permission data can be stored (e.g., in the same data store or a different data store storing the operational data) and indicate the set of permissions and the associated zone(s). The data store can be in the vehicle 100 or external to the vehicle 100. The operational data can include a permission identifier that uniquely identifies a permission and/or a permission descriptor that describes the permission and a zone identifier(s) of the zone(s) to which the permission applies.

The permission data can change over time. For example, a change from one set of permissions to another set of permissions can be triggered from one or more zones 101-104 (e.g., from the driver zone 101 by using the display 120, the speaker 125, and/or any other device of the driver zone 101) and/or via the computing component 130, and/or can be the same trigger as that of an operational mode change. The permission data in the data store to indicate the change.

In the illustration of FIG. 1, the mobile device 110 receives incoming audio data 192 from the device 190 over, for instance, a cellular network. Given the data connection with the computing component 130, the incoming audio data 112 is sent, as incoming audio data 114, from the mobile device 110 to the computing component 130 over the data connection. The incoming audio data 114 represents natural language speech of a user of the device 190. The computing component 130 also receives input audio data 131 associated with the first zone 101, where the input audio data 131 corresponds to natural language speech detected in the first zone 101 and corresponding to a rider in the first zone 101. Further, the computing component 130 receives input audio data 132 associated with the third zone 103, where the input audio data 132 corresponds to natural language speech detected in the third zone 103 and corresponds to a rider in the third zone 103.

The computing component 130 supports different functions related to communications session. For example, the computing component 130 can generate and update the zone configuration data, the operational data, and the permission data. Further, for each zone associated with a communications session, the computing component 130 can execute a communications application for processing and outputting audio data and other type of data to be output in the zone (e.g., by a speaker(s) and/or a display(s) thereof).

Different audio processing operations on the received audio data are possible. For example, the computing component 130 mixes the incoming audio data 114 and the input audio data 132 to generate output audio data 133. To illustrate, the incoming audio data 114 represents a first audio stream generated at a first sampling rate. The second input audio data 132 represents a second audio stream generated at a second sampling rate. If the two sampling rates are different, the mixing can involve down-sampling the audio stream having the higher sampling rate to the lower sampling rate or up-sampling the audio stream having the lower sampling rate to the higher sampling rate. The mixing can also involve multiplexing the two audio streams to generate a multiplexed audio stream that represents multiplexed audio data. The multiplexing can include combining the two audio streams sample-by-sample by aligning the samples, optionally scaling up or down their amplitudes, and adding the amplitudes of the aligned samples. The output audio data 133 can be generated as an output audio stream from the multiplexed audio stream. In particular, an encoding scheme (e.g., one using a compression-decompression (codec)) can be applied to the multiplexed audio data such that the multiplexed audio data is encoded and corresponds to the output audio data 122. This output audio data 133 is sent to the speaker 125 of the first zone 101, whereby this speaker 125 presents a first output 127 that corresponds to the output audio data 133 and that represents the natural language speech of the device's 190 user and the natural language speech of the third zone's 103 rider. The computing component 130 also mixes the incoming audio data 114 and the input audio data 131 to generate output audio data 134. This output audio data 134 is sent to the speaker 155 of the third zone 103, whereby this speaker 155 presents a second output 157 that corresponds to the output audio data 134 and that represents the natural language speech of the device's 190 user and the natural language speech of the first zone's 101 rider. In addition, the computing component 130 mixes the input audio data 131 and the input audio data 142 to generate outgoing audio data 135 representing the natural language speech of the natural language speech of the first zone's 101 rider and the natural language speech of the third zone's 103 rider. The outgoing audio data 135 is sent over the data connection to the mobile device 110 that then sends it, as outgoing audio data 112, to the device 190 over the cellular network.

In addition to processing audio data, the computing component 130 can cause displays to present various communications session-related data. In an example, the computing component 130 sends data and a command to the first display 120 in the first zone 101. The data can identify the callee (in case of an outgoing phone call) or the caller (in case of an incoming phone call). The data can also indicate that the third zone 103 is associated with the communications session by including, for instance, the zone identifier of the third zone 103 and/or a descriptor about the third zone 103. Other pieces of data are possible. In certain situations, rider detection can be used as further described herein below, to identify each a rider of the third zone 103 (e.g., by identifying a related profile). In such a case, a rider identifier (e.g., available from profile information) can be included in the data. An identification of the type of communications session (e.g., a phone call) can also be included in the data. The command instructs the display 120 to present a GUI that presents at least some of the data. For example, the GUI can include a contact field 122 identifying the callee or caller.

The GUI can also include a zone participant field 124 indicating that the third zone 103 is a participant in addition or alternative to identifying that the first zone 101 is also a participant. Other GUI fields are also or alternatively possible, such as a GUI field that presents the rider identifier and/or a GUI field that indicates the type of communications session.

Similarly, the computing component 130 sends data and a command to the second display 150 in the third zone 103. The data can identify the callee or the caller and indicate that the first zone 101 is associated with the communications session and/or that the first zone 101 added the third zone 103 to the communications sessions. Other pieces of data are possible, such as rider identifier of the rider in the third zone 103, and/or an indicator or descriptor of the type of communications session. The command instructs the display 150 to present a GUI that presents at least some of the data. For example, the GUI can include a contact field 152 identifying the callee or caller. The GUI can also include a zone participant field 154 indicating that the first zone 101 is a participant in addition or alternative to identifying that the third zone 103 is also a participant. Other GUI fields are also or alternatively possible, such as a GUI field that presents the rider identifier and/or a GUI field that indicates the type of communications session.

The mobile device 110 can be a smartphone and is described herein above as an example of a device that can be located (e.g., temporarily) in a zone and communicatively coupled with the computing component 130. Other types of devices are likewise possible to use including, for instance, a tablet, a wearable device, and the like. Generally, a device includes one or more processors, one or memory storing instructions that are executable by the one or more processors to provide communications functions, and one or more interfaces to enable communicatively coupling the device with the computing component 130 and, possibly, other devices (e.g., the device 190 over the cellular network or any other type of data network). Likewise, the device 190 is an example of an endpoint that is outside of the vehicle and that can be a participant in a communications session. The device 190 can be of any type including, a smartphone, a tablet, a laptop computer, a desktop computer, a smart speaker, a wearable device, and the like. Generally, the device 190 includes one or more processors, one or memory storing instructions that are executable by the one or more processors to provide communications functions, and one or more interfaces to enable communicatively coupling the device with a device in the vehicle 100 (e.g., the mobile device 110) and/or the computing component 130 over a cellular network and/or any other type of data network and, possibly, with other devices (e.g., with other mobile devices).

Figure 2:
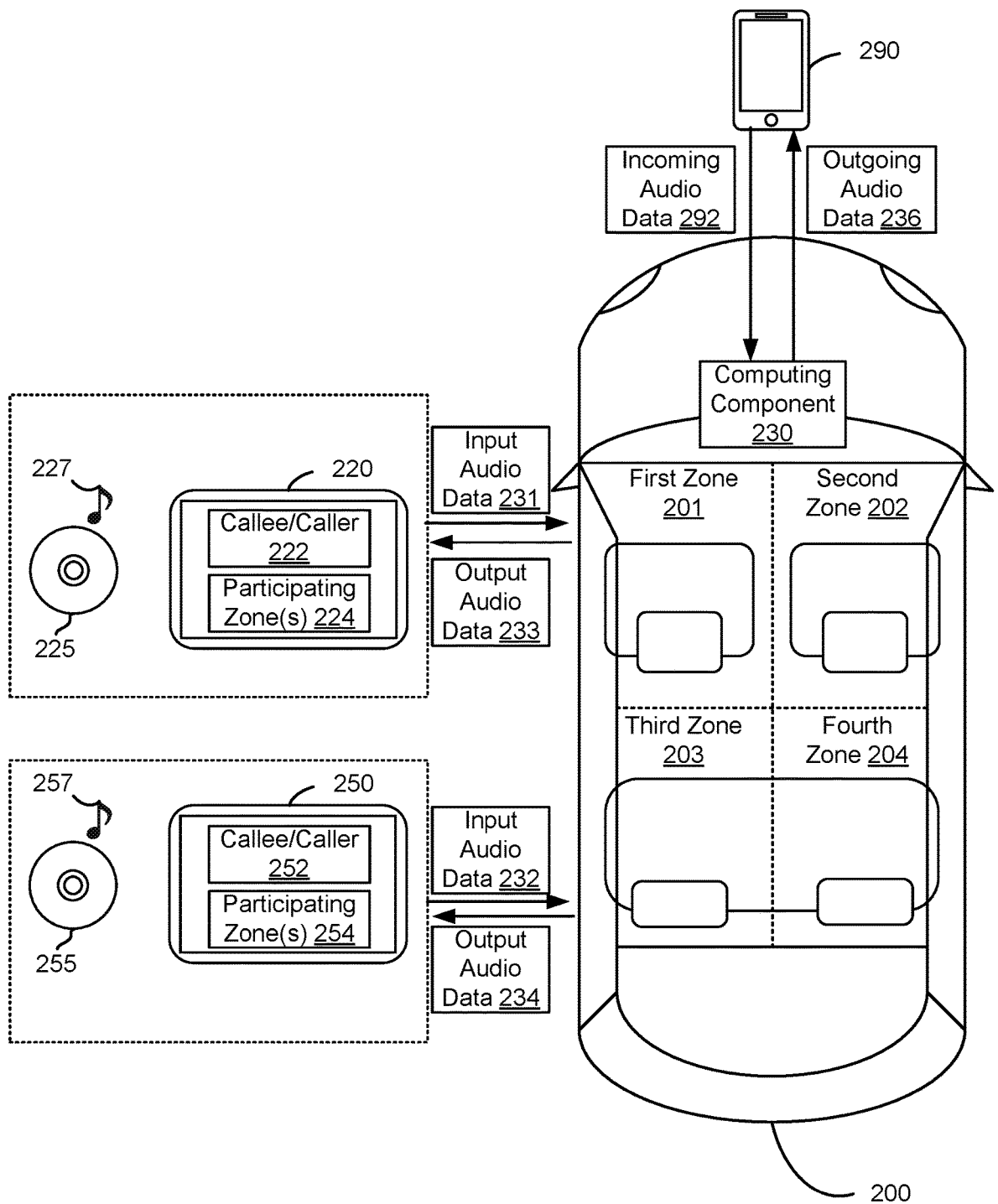
FIG. 2 illustrates another example of multiple zones in a vehicle and related communications, according to embodiments of the present disclosure.

FIG. 2 illustrates another example of multiple zones in a vehicle 200 and related communications, according to embodiments of the present disclosure. As illustrated, the vehicle 200 includes four zones: a first zone 201, a second zone 202, a third zone 203, and a fourth zone 204, although a different zone configuration is possible. Components (e.g., speakers, displays, microphones) to facilitate multi-zonal communications sessions are similar to those of the vehicle 100. Similarities are not repeated herein and, instead, the description of such components and related operations of FIG. 1 equivalently applies herein. Rather than a device (e.g., similar to the mobile device 110) being communicatively coupled with a computing component 230 of the vehicle 200, an endpoint within the vehicle is used for a communications session, where this endpoint includes at least a speaker within a zone and a set of microphones (e.g., a microphone within the zone or a microphone array). The computing component 230 can execute a communications application for such an endpoint to enable the exchange of data (e.g., audio data) in the communications session. The computing component 230 can be similar to the computing component 130 of FIG. 1.

In an example, the first zone 201 and the third zone 203 are associated with a communications session that involves a device 290 located outside of the vehicle 200 (similar to the device 190 of FIG. 1). The computing component 230 stores configuration data indicating that a display 220 and a speaker 225 are associated with the first zone 201 and that a display 250 and a speaker 255 are associated with the third zone 203. In the case of zone-dedicated microphones, this zone configuration data also indicates that a microphone installed in the first zone 201 is associated with the first zone 201 and a microphone installed in the third zone 203 is associated with the third zone 203. In the case of a microphone array, the zone configuration data can indicate instead a beam direction corresponding to each zone. The zone configuration data also indicates that the display 250, speaker 255, and a set of microphones (e.g., the zone-dedicated microphone or the microphone array) correspond to an endpoint associated with the first zone 201. Similarly, the zone configuration data indicates that the display 270, speaker 275, and a set of microphones (e.g., the zone-dedicated microphone or the microphone array) correspond to another endpoint associated with the third zone 203.

The computing component 230 supports different functions related to communications session. For example, the computing component 230 executes a communications application for each endpoint corresponding to the first zone 201 or the third zone 203, where the communications application is executed to process and output audio data and other type of data to be output in the corresponding zone 201 or 203.

As illustrated, the computing component 230 receives incoming audio data 292 from the device 290 (e.g., over a cellular network and/or other type of data networks). The incoming audio data 292 represents natural language speech of a user of the device 290. The computing component 230 also receives input audio data 231 associated with the first zone 201, where the input audio data 231 corresponds to natural language speech detected in the first zone 201 and corresponding to a rider in the first zone 201. Further, the computing component 230 receives input audio data 232 associated with the third zone 203, where the input audio data 232 corresponds to natural language speech detected in the third zone 203 and corresponds to a rider in the third zone 203.

The computing component 230 mixes the incoming audio data 292 and the input audio data 232 to generate output audio data 233. This output audio data 233 is sent to the speaker 225 of the first zone 201, whereby this speaker 225 presents a first output 227 that corresponds to the output audio data 233 and that represents the natural language speech of the device's 290 user and the natural language speech of the third zone's 203 rider. The computing component 230 also mixes the incoming audio data 292 and the input audio data 231 to generate output audio data 234. This output audio data 234 is sent to the speaker 255 of the third zone 203, whereby this speaker 255 presents a second output 257 that corresponds to the output audio data 234 and that represents the natural language speech of the device's 290 user and the natural language speech of the first zone's 201 rider. In addition, the computing component 230 mixes the input audio data 231 and the input audio data 242 to generate outgoing audio data 236 representing the natural language speech of the natural language speech of the first zone's 201 rider and the natural language speech of the third zone's 203 rider. The outgoing audio data 236 is sent to the device 290.

In addition to processing audio data, the computing component 230 can cause displays to present various communications session-related data. In an example, the computing component 230 sends data and a command to the first display 220 in the first zone 201. The data can identify the callee (in case of an outgoing phone call) or the caller (in case of an incoming phone call). The data can also indicate that the third zone 203 is associated with the communications session by including, for instance, the zone identifier of the third zone 203 and/or a descriptor about the third zone 203. Other pieces of data are possible, such as a rider identifier and/or an indication of the type of communications session (e.g., a phone call). The command instructs the display 220 to present a GUI that presents at least some of the data. For example, the GUI can include a contact field 222 identifying the callee or caller. The GUI can also include a zone participant field 224 indicating that the third zone 203 is a participant in addition or alternative to identifying that the first zone 201 is also a participant. Other GUI fields are also or alternatively possible, such as a GUI field that presents the rider identifier and/or a GUI field that indicates the type of communications session.

Similarly, the computing component 230 sends data and a command to the second display 250 in the third zone 203. The data can identify the callee or the caller and indicate that the first zone 201 is associated with the communications session and/or that the first zone 201 added the third zone 203 to the communications sessions. Other pieces of data are possible, such as rider identifier and/or an indication of the type of communications session. The command instructs the display 250 to present a GUI that presents at least some of the data. For example, the GUI can include a contact field 252 identifying the callee or caller. The GUI can also include a zone participant field 254 indicating that the first zone 201 is a participant in addition or alternative to identifying that the third zone 203 is also a participant. Other GUI fields are also or alternatively possible, such as a GUI field that presents the rider identifier and/or a GUI field that indicates the type of communications session.

Figure 3:
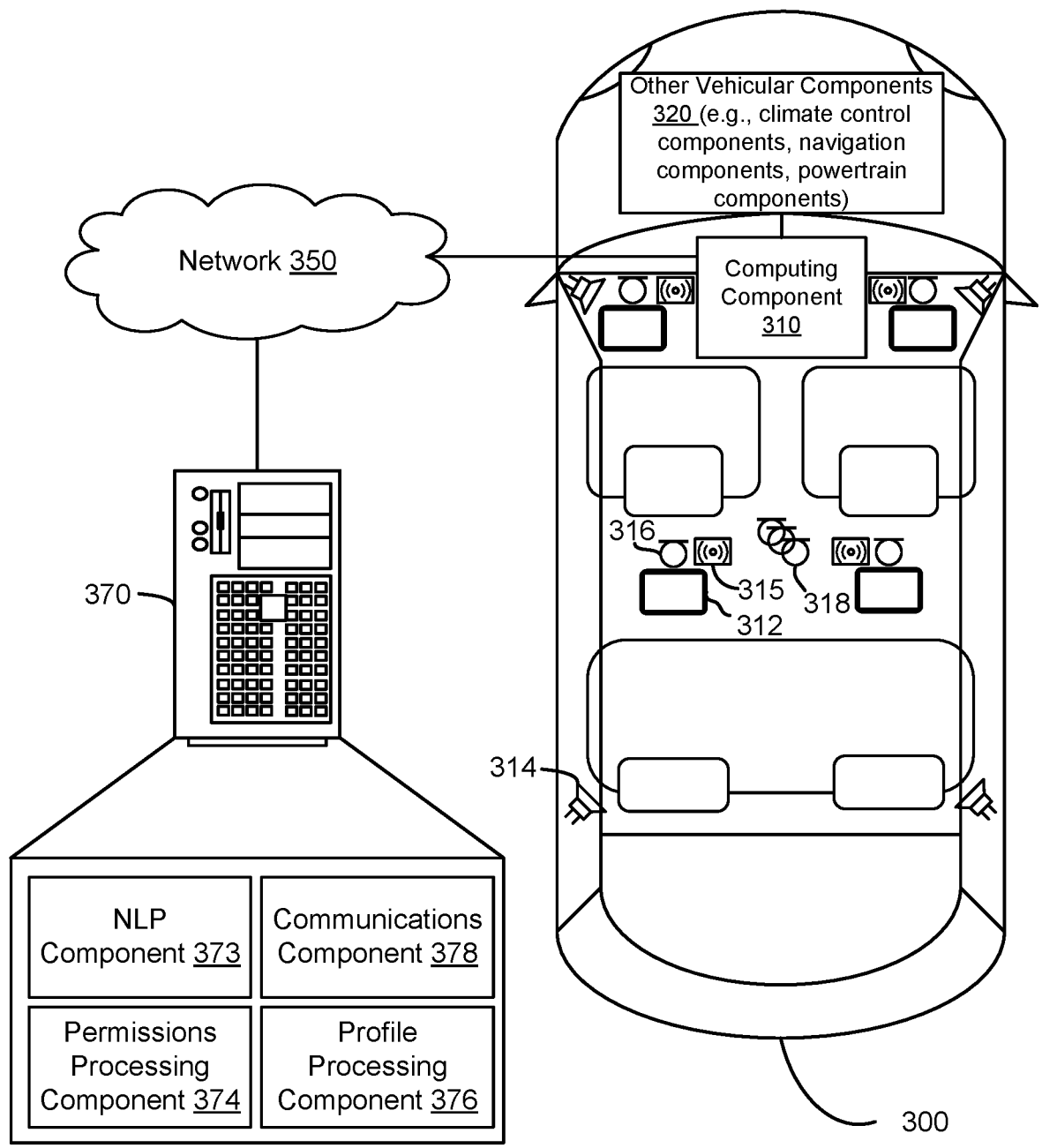
FIG. 3 illustrates an example of a multiple zone configuration of a vehicle, according to embodiments of the present disclosure.

FIG. 3 illustrates an example of a multiple zone configuration of a vehicle, according to embodiments of the present disclosure. The vehicle 300 is an example of the vehicles 100 and 200 of FIGS. 1 and 2. The vehicle 300 can include a computing component 310 and plurality of vehicular systems 320, such as an infotainment system, a powertrain system, a climate control system, a navigation system, etc. The computing component 310 can support multi-zonal communication functionalities described herein. This computing component 310 can be integrated with one or more of the vehicular systems, such as by being a component of the infotainment system, although it may be possible to implement the computing component 310 as a standalone component that interfaces with the infotainment system and/or other vehicular systems. In the illustration of FIG. 3, the infotainment system includes the computing component 310, a plurality of displays 312, a plurality of speakers 314, a plurality of vehicle interfaces 315, and a plurality of microphones 316 and 318 that are installed in the vehicle 300. The powertrain system can include components that are installed in the vehicle 300 and that control and cause movement of the vehicle 300. The climate control system can include components that are installed in the vehicle 300 and that control and cause climate control (e.g., air flow, air temperature, etc.) in a cabin of the vehicle 300. The navigation system components can include a satellite receiver for satellite-based positioning of the vehicle 300. Such powertrain components, climate control components, and navigation system components are shown as part of vehicular components 320 in FIG. 3.

The computing component 310 can be communicatively coupled with the vehicular components 320 (e.g., over one or more controlled area network (CAN) buses). Further, computing component 310 can be communicatively coupled with an external set of computers 370 over a network 350 (e.g., wirelessly via cellular connection, a Wi-Fi connection, or other types of connections over the Internet).

In the illustration of FIG. 3, the cabin's vehicle is shown as including two rows of seats and two columns of seats, thereby forming a 4×4 matrix of seats that can be associated with four zones (e.g., the zones 101-14 of FIG. 1). A different number of rows and columns can be possible (e.g., a third row of seats is possible, where the second row and/or the third can include more than two seats). Generally, each seat can be associated with a set of endpoints of the infotainment system (e.g., display(s), speaker(s), vehicle interface(s), and optionally dedicated microphone(s)), where this set is communicatively coupled with the computing component 310 and can be associated with a zone.

In an example, the displays 312 are installed in different locations within the cabin of the vehicle 300. For instance, at least one display is installed in the front left part of the cabin and can be associated with a driver zone (e.g., the first zone 101 of FIG. 1), at least one display is installed in the front right part of the cabin and can be associated with a front passenger zone (e.g., the second zone 101 of FIG. 1), at least one display is installed in the rear left part of the cabin and can be associated with a rear left passenger zone (e.g., the third zone 103 of FIG. 1), and at least one display is installed in the rear right part of the cabin and can be associated with a rear right passenger zone (e.g., the fourth zone 104 of FIG. 1). Other displays can be installed in the cabin and can be associated with multiple zones (e.g., a front center console display that can be available to both the driver zone and the front passenger zone, an infotainment head unit that can also be available to both front zones, a rear ceiling or console display that can be available to both the rear zones, etc.). A display can be a device that includes, among other things, a set of processors, a set of memory, and an output screen such as a touchscreen and/or heads up display (HUD). A display can be installed in front of a seat to provide display output to that seat. A display can be integrated with other components of the vehicle 300. For example, in the case of the driver zone, a display can be integrated with the center console that provides other vehicular outputs (e.g., speed, RPM, system messages, alerts, navigation data, etc.).

Similarly, the speakers 314 are installed in different locations within the cabin of the vehicle 300. For instance, at least one speaker is installed in the front left part of the cabin and can be associated with the driver zone, at least one speaker is installed in the front right part of the cabin and can be associated with the front passenger zone, at least one speaker is installed in the rear left part of the cabin and can be associated with the rear left passenger zone, and at least one speaker is installed in the rear right part of the cabin and can be associated with the rear right passenger zone. Other speakers can be installed in the cabin and can be associated with multiple zones (e.g., a front center console speaker that can be available to both the driver zone and the front passenger zone, a rear console speaker that can be available to both the rear zones, a ceiling speaker can be available to all zones, etc.). A speaker can be integrated in a display and/or another cabin component (e.g., in a headrest of a seat).

The vehicle interfaces 315 are installed in different locations within the cabin of the vehicle 300. Each vehicle interface 315 enables a device that may be brought into the vehicle to be communicatively coupled with the computing component 310. For instance, each vehicle interface 315 can include a Bluetooth connectivity chip that enables a device to be paired therewith using Bluetooth communication protocols (e.g., asynchronous connection-less (ACL) protocol, synchronous-connection-oriented (SCO) protocol, and/or other controller and/or host stack protocols) such that, upon the pairing, a Bluetooth link can be established with the computing component 310 and the device can be setup as a secondary device, whereas the computing component 310 is a primary device. In the illustration of FIG. 3, at least one vehicle interface is installed in the front left part of the cabin and can be associated with the driver zone, at least one vehicle interface is installed in the front right part of the cabin and can be associated with the front passenger zone, at least one vehicle interface is installed in the rear left part of the cabin and can be associated with the rear left passenger zone, and at least one vehicle interface is installed in the rear right part of the cabin and can be associated with the rear right passenger zone. Other vehicle interfaces can also be installed in the cabin. A vehicle interface can be integrated in a display, a speaker, and/or another cabin component (e.g., in a headrest of a seat).

In an example, the microphones 316 are seat dedicated microphones, where each one of them is uniquely associated with a seat. In this example, the microphones 316 are installed in different locations within the cabin of the vehicle 300. For instance, at least one microphone is installed in the front left part of the cabin and can be associated with the driver zone, at least one microphone is installed in the front right part of the cabin and can be associated with the front passenger zone, at least one microphone is installed in the rear left part of the cabin and can be associated with the rear left passenger zone, and at least one microphone is installed in the rear right part of the cabin and can be associated with the rear right passenger zone. A microphone can be integrated in a display, a speaker, and/or another cabin component (e.g., in a backrest of a seat). Alternative or in addition to the microphones 316, the microphones 318 can be installed in the cabin of the vehicle 300. The microphones 318 can include an array of microphones that support audio beamforming. In such a case, the array can be installed in one location in the vehicle 300 (e.g., around the center point of the ceiling in the cabin).

Configuration data can be stored and can associate each display 312, each speaker 314, each vehicle interface 315, and, as applicable, each microphone 316 with a zone by associating the corresponding device identifiers with the zone identifier. Operational data can also be stored and associate each zone with an operational mode that applies to the zone by associating zone identifiers with operational mode identifiers. Permission data can also be stored and associate each zone with a set of permissions by associating each zone identifier with a permission identifier(s) and/or a permission descriptor(s). The computing component 310 can include a set of data stores that store the configuration data, the operational data, and the permission data, although a set of data stores external to the vehicle 300 (e.g., included in the set of computers 370) can redundantly or alternatively store any of the configuration data, the operational data, or the permission data. If stored externally, the configuration data, the operational data, or the permission data can be associated with a vehicle identifier unique to the vehicle 300 (e.g., a vehicle identification number (VIN) and/or an account identifier of an account associated with the vehicle 300 (e.g., an account of the owner, operator, driver, or passenger of the vehicle 300).

In operation, the computing component 310 receives input data sent from an endpoint installed in the vehicle 300. In the case when the endpoint is a display, the input data can include text data generated by the display in response to user input at the display. This input data can be associated with a display identifier that the computing component 310 can map to a zone identifier based on the configuration data. As such, the computing component 310 can determine that the input data has originated from a particular zone. In the case when the endpoint is a seat dedicated microphone, the input data can include audio data generated by the microphone in response to a user natural language utterance detected by the microphone. This input data can be associated with a microphone identifier that the computing component 310 can map to a zone identifier based on the configuration data. As such, the computing component 310 can also determine that the input data has originated from a particular zone. In the case when the endpoint is the microphone array, the input data can include audio data generated by the microphone array in response to a user natural language utterance detected by the microphone array. Beamforming techniques are used to determine a beam direction from which the audio has originated relative to the microphone area. Data indicated the direction can be sent along with the audio data to the infotainment system. The computing component 310 can map the direction, as indicated in the data, to a zone identifier based on the configuration data. As such, the computing component 310 can also determine that the input data has originated from a particular zone. Alternatively, the configuration data can be accessible to or stored by audio processing circuitry of the microphone array that then can determine the zone identifier that corresponds to the beam audio direction and can send this zone identifier along with the audio data to the computing component 310.

In an example, the input data can request a particular operation to be performed (e.g., accept a phone call, initiate a phone call, add a zone to a phone call, remove a zone from a phone call (e.g., dissociate a zone identifier of the zone and a session identifier of a communications session), mute a zone participating in a phone call, and the like). In the case of audio data, the computing component 310 can detect a wake word and accordingly record and send the audio data to the set of computers 370. Additionally or alternatively, the computing component 310 can perform natural language processing (e.g., automatic speech recognition (ASR) processing, natural language understanding (NLU) processing, and/or other types of natural language processing (NLP) algorithms) on the input data to then send the resulting data or a command (e.g., to initiate the particular operation) to the set of computers 370. In either case, the set of computers 370 receives and processes data (e.g., text data, audio data, NLP data) and/or a command from the computing component 310 to then trigger execution of the operation and send result data and/or a command to the computing component 310.

In an example, the set of computers 370 includes an NLP component 372 that can perform NLP operations on the received data to determine, among other things, an intent (e.g., to perform the particular operation) and tokens (e.g., the type of operation, the target of the operation such as a contact for a phone call or a zone to add and/or remove). The set of computers 370 also includes a communications component 378 usable for when the operation relates to establish a communications session with a device located outside of the vehicle 300. In certain implementations, the set of computers 370 also includes permissions processing component 374 that stores the permission data described herein. In such implementations, the computing component 310 can query the permissions processing component 374 by using a zone identifier corresponding to a zone to determine the set of permissions associated with the zone, where such permissions can be indicated in a query result.

Furthermore, the set of computers 370 can include a profile processing component 376 that stores profile data. The profile data can correspond to a profile of a rider (e.g., a driver or a passenger) of the vehicle 300. The computing component 310 can identify the profile using one or more techniques such as upon a user login via a display 312 and/or a microphone 316 and can send the profile identifier to the profile processing component 376. Alternatively or additionally, the profile processing component 376 can identify the profile based on other data received from computing component 310. For instance, audio fingerprinting techniques can be applied to the audio data received from the computing component 310 to identify the profile. Or a device identifier of a mobile device paired with a vehicle interface 315 can be received and mapped to the profile identifier.

The profile data can be used in different way. In one example, the profile data is used to customize the user experience at a seat of the vehicle 300 (e.g., in a zone). For instance, the profile data indicates user settings or preferences to use a particular communications application. In this case, when an operation to establish a communications session is requested, the communications application is executed. In another illustration, some of the profile data can be used to customize the content presented at a GUI of the display 312 (e.g., by including the rider's name and presenting and arranging GUI components on the GUI according to user settings).

In other example use of the profile data, the set of permissions available to the zone can also depend on the profile data. For instance, if the profile data indicates that the rider is the owner or a primary user of the vehicle 300, the set of permissions can correspond to the full set of controls. In comparison, if the profile data indicates that the rider is a passenger or a secondary user of the vehicle 300, the set of permissions can be a limited set.

Upon the processing of data received from the computing component 310, the set of computers 310 can send a command to the computing component 310 related to the requested operation. In certain situations, a requested operation need not be communications session-related, but can relate to controls over one or more of the vehicular components 320 (e.g., an operation to change the cabin temperature, to change a powertrain setting, etc.). In certain implementation, the corresponding input data can be processed as described herein above (e.g., fully by the computing component 310 and/or in a distributed manner between the computing component 310 and the set of computers 370). Here, the permissions can also be checked to determine if such operations can be authorized. If so, the computing component 310 can send a command to the corresponding vehicular components 320 to trigger the operation. For instance, in the case of climate control, input data originating from a zone other than the driver zone can be permitted to control the air flow and temperature in that zone only. In comparison, input data originating from the driver zone can be permitted to control the air flow and temperature in any zone. Input data requesting particular navigation to a destination or particular powertrain setting (e.g., to set a cruise control speed) can be permitted only when originating from the driver zone.

Although FIG. 3 illustrates various computing components 373, 374, 376, and 378 that may be implemented remotely from the vehicle 300, some or all of these computing components 373, 374, 376, and 378 can be implemented locally to the vehicle 300. For example, any or all of the NLP component 373, permissions processing component 374, profile processing component 376, and/or communications component 378 can be included in the computing component 310 of the vehicle 300.

Figure 4:
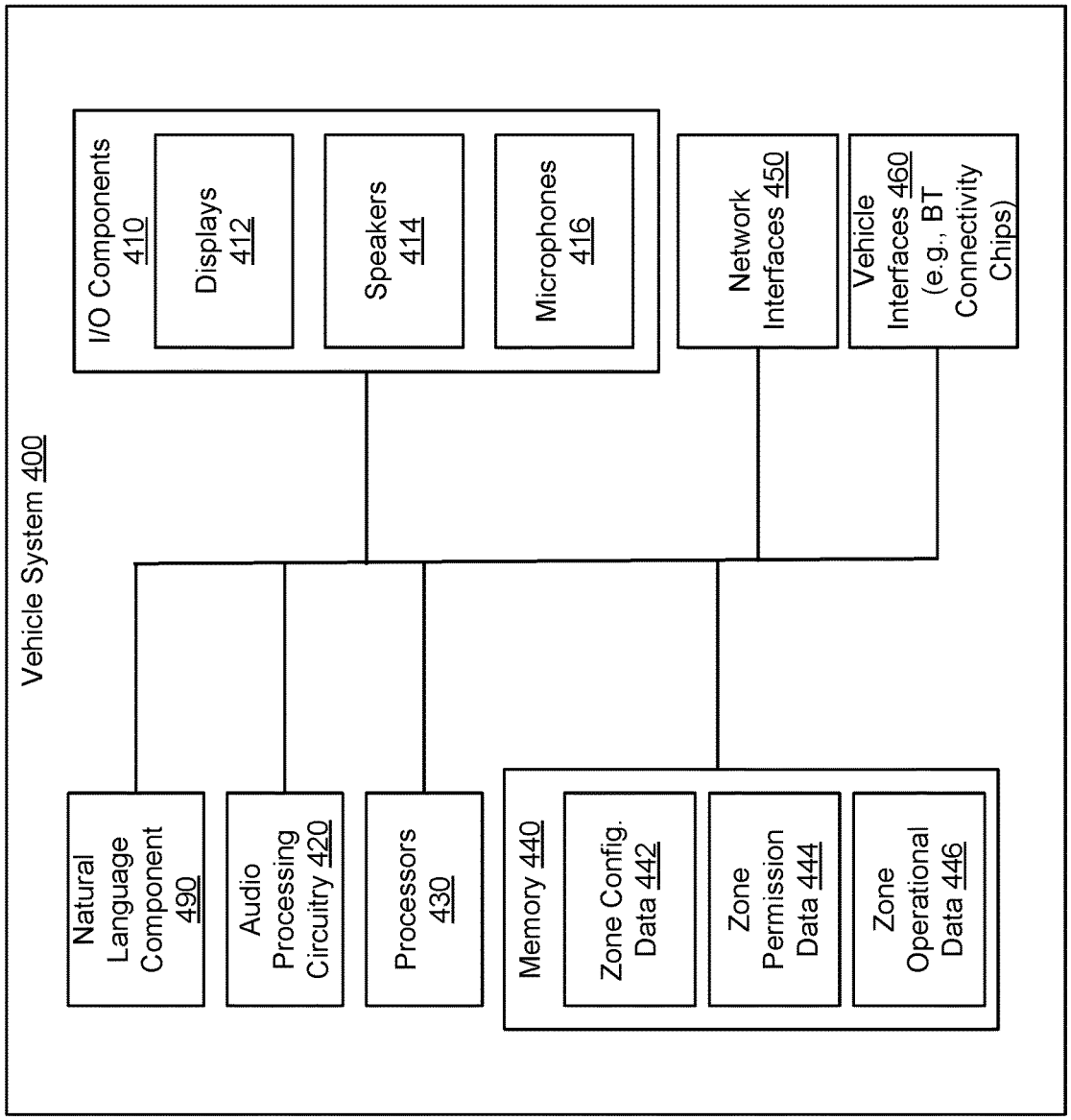
FIG. 4 illustrates an example of vehicle system that enables multiple zone communications, according to embodiments of the present disclosure.

FIG. 4 illustrates an example of vehicle system 400 that enables multiple zone communications, according to embodiments of the present disclosure. As illustrated, the vehicle system 400 includes input/output (I/O) components 410 such as displays, speakers 415, and microphones 416. Such I/O components can be distributed in a cabin of a vehicle, as discussed herein above in connection with FIG. 3. The vehicle system 400 also includes audio processing circuitry 420, processors 430, and memory 440, which may form, at least in part, a computing component such as the one described herein above in connection with FIGS. 1-3.

In an example, the audio processing circuitry 420 can be configured to process, at least in part, audio data generated by the microphones 416 and to output audio data to the speakers 414. An example of the audio processing circuitry 420 is further described in connection with the next figure. The processors 430 can execute program codes (e.g., computer-readable instructions) stored in the memory 440 and related to processing input data received from multiple sources including the displays 412, other vehicular components (e.g., a navigation component, a climate control component, a powertrain component), and sources external to the vehicle (e.g., to buffer, reformat, de-compress, decrypt, and/or perform other operations on content data received from an external content source) and/or related to outputting data to send to the displays 412, the other vehicular systems, and/or destination endpoints external to the vehicle. In addition to storing the program codes, the memory 440 can store any of zone configuration data 442, zone permission data 444, and/or zone operational data 446 as described in connection with FIGS. 1-3.

As further illustrated in FIG. 4, the vehicle system 400 includes network interfaces 450 and vehicle interfaces 460. The network interfaces 450 can include a set of network interface cards (NICs) that enable the infotainment server to communicate with computer components external to the vehicle over one or more networks, such as with the set of computers 270 over the network 250. The NICs can implement various types of communication technologies, such as long term evolution (LTE or 4G) cellular communication technologies, new radio (NR or 5G) cellular communication technologies, Wi-Fi cellular communication technologies, and the like. The vehicle interfaces 460 can include a set of NICs and/or data ports for communications with other vehicular components (e.g., the vehicular components 320 of FIG. 3). For example, the vehicle interfaces 460 support CAN communications. In addition, the vehicle interfaces 460 can include connectivity chips for short range wireless communications (e.g., for Bluetooth communications) and/or wired communications (e.g., universal serial bus (USB) communications) with devices that may be brought into the vehicle.

Components of the vehicle system 400 can be interconnected using different technologies. For instance, a memory bus can communicatively couple the memory 440 and the processors 430 and another memory bus can communicatively couple the memory 440 and the audio processing circuitry 430. Wireless, short range communications and/or wired connections can be used to communicatively couple the I/O components 440 with the infotainment server.

In an example, the vehicle system 400 can also include a natural language component 490 that processes audio data generated by the microphones 416 (independently of, after, or before processing of such audio data by the audio processing circuitry 420). In an example, upon detection by the audio processing circuitry 420 of a wake word, the audio processing circuitry 420 can send audio data to the natural language component 490. In turn, the natural language component 490 performs speech processing on the audio data. An output of the speech processing can indicate a command to control vehicle functions, such as to initiate an outgoing phone call, to accept an incoming phone call, control audio/video outputs, control climate control components, control a navigation component, control a powertrain component, and the like.

The natural language component 490 can include, among other things, a natural language processing (NLP) component, skill component, a language output component, a user recognition component, and a profile storage component. The NLP component can include an automatic speech recognition (ASR) component and a natural language understanding (NLU) component. The language output component can include a natural language generator (NLG) component and a text to speech (TTS) component). The skill component can include skills and/or can have access to a skill system remote from the vehicle and can be configured to execute commands based on the output of the natural language processing component.

The NLG component can generate text for purposes of TTS output to a user. For example, the NLG component may generate text corresponding to instructions corresponding to a particular action for the user to perform. The NLG component may generate appropriate text for various outputs as described herein. The NLG component may include one or more trained models configured to output text appropriate for a particular input. The text output by the NLG component may become input for the TTS component. Alternatively or in addition, the TTS component may receive text data from a skill or other system component for output.

The NLG component may include a trained model. The NLG component generates text data such that the output text data has a natural feel and, in some embodiments, includes words and/or phrases specifically formatted for a requesting individual. The NLG component may use templates to formulate responses. The NLG component may include models trained from the various templates for forming the output text data. For example, the NLG component may analyze transcripts of local news programs, television shows, sporting events, or any other media program to obtain common components of a relevant language and/or region. As one illustrative example, the NLG component may analyze a transcription of a regional sports program to determine commonly used words or phrases for describing scores or other sporting news for a particular region. The NLG component may further receive, as inputs, a dialog history, an indicator of a level of formality, and/or a command history or other user history such as the dialog history.

The NLG component may generate dialog data based on one or more response templates. For example, the NLG component may select a template in response to the question, "What is the temperature of the vehicle cabin?" of the form: "the temperature is $temperature_information$." The data for "$temperature_information$" can be retrieved from another vehicle component, such as from a climate control component. The NLG component may analyze the logical form of the template to produce one or more textual responses including markups and annotations to familiarize the response that is generated. In some embodiments, the NLG component may determine which response is the most appropriate response to be selected. The selection may, therefore, be based on past responses, past questions, a level of formality, and/or any other feature, or any other combination thereof. Responsive audio data representing the response generated by the NLG component may then be generated using the text-to-speech component.

In at least some embodiments, the natural language component 490 may be configured to handle only a subset of the natural language user inputs that may be handled by the set of computers 370. For example, such subset of natural language user inputs may correspond to local-type natural language user inputs, such as those controlling devices or components associated with the vehicle. In such circumstances the on-device language processing components may be able to more quickly interpret and respond to a local-type natural language user input, for example, than processing that involves the set of computers 370.

The ASR component is configured to receive audio data and to recognize speech in the audio data 2011, and the NLU component is configured to determine a user intent from the recognized speech, and to determine how to act on the user intent by generating NLU output data which may include directive data (e.g., data for a command that instructs a component to perform an action). In some cases, a directive may include a description of the intent and/or an identifier of component(s), and an operation to be performed at the component(s). Directive data may be formatted using Java, such as JavaScript syntax, or JavaScript-based syntax. This may include formatting the directive using JSON. An NLU hypothesis (output by the NLU component) may be selected as usable to respond to a natural language user input.

In at least some embodiments, the skill component may correspond to one or more domains that are used in order to determine how to act on a spoken input in a particular way, such as by outputting a directive that corresponds to the determined intent, and which can be processed to implement the desired operation. The skill component may include, without limitation, a control skill component (or device control domain) to execute in response to spoken inputs corresponding to an intent to control another component(s) in the vehicle, a music skill component (or music domain) to execute in response to spoken inputs corresponding to an intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the natural language component may interface with one or more skill systems 2025. For example, a skill system may be located in remotely from the vehicle and communications therewith can be over a network(s) However, the skill system may be configured in a local environment of the vehicle. As used herein, a "skill" may refer to a skill component, a skill system, or a combination of a skill component and a corresponding skill system.

The natural language component 490 may be configured to recognize multiple different wake words and/or perform different categories of tasks depending on the wake word. Such different wake words may invoke different processing components. For example, detection of the wake word "Alexa" may result in sending audio data to certain language processing components/skills for processing while detection of the wake word "Car" may result in sending audio data different language processing components/skills for processing.

One or more of the herein described components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 5:
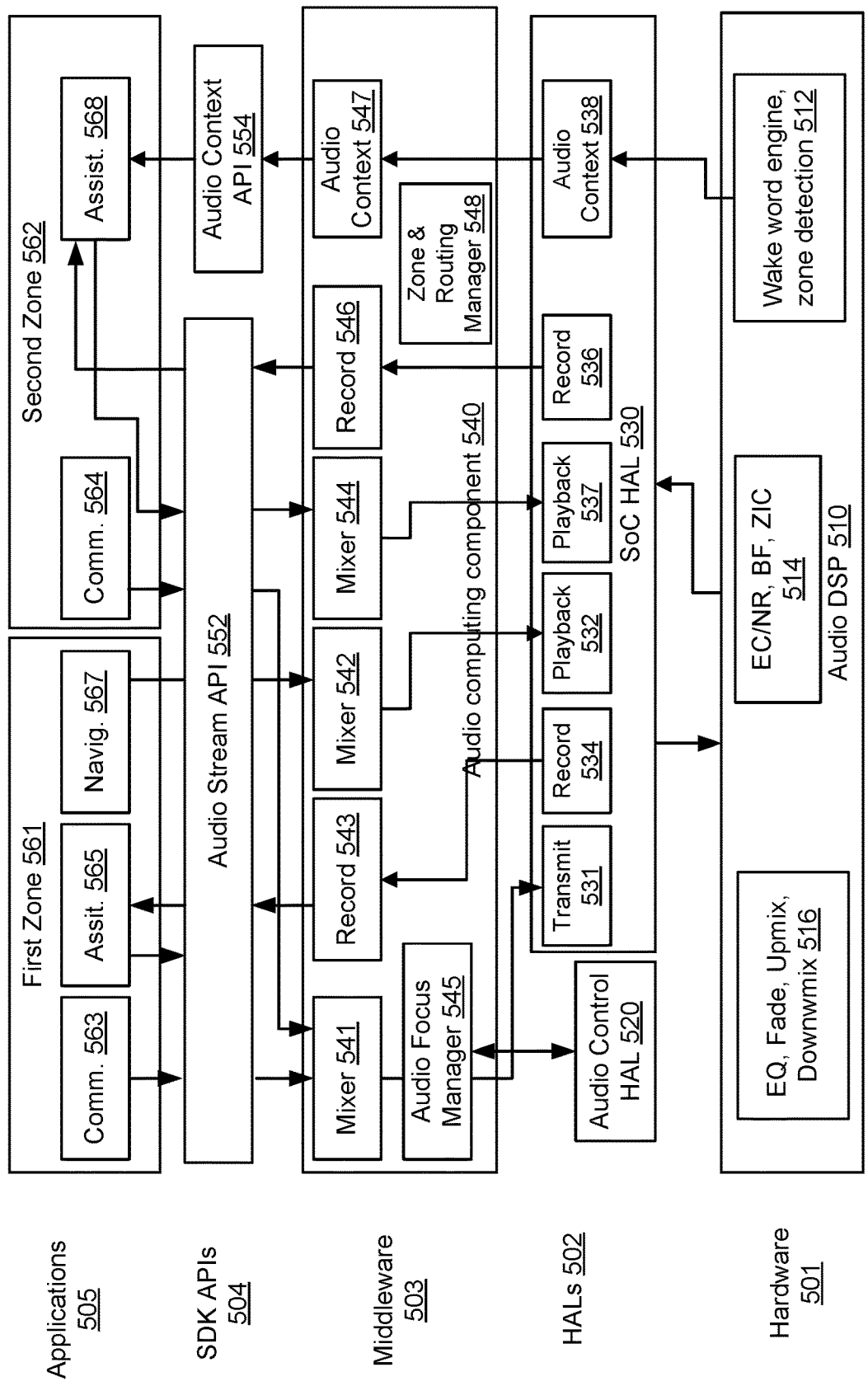
FIG. 5 illustrates an example of audio processing circuitry of a vehicle, according to embodiments of the present disclosure.

FIG. 5 illustrates an example of audio processing circuitry of a vehicle, according to embodiments of the present disclosure. The audio processing circuitry is an example of the audio processing circuitry 420 of FIG. 4. As illustrated, the audio processing circuitry includes hardware 501 and software components such as hardware abstraction layers (HALs) 502, middleware 503, software development kit (SDK) application programming interfaces (APIS) 504, and applications 505.

The hardware 501 can include an audio digital signal processor (DSP) 510 that provides inputs and output operations. As far as the input operations, the audio DSP 510 implements a wake word engine and zone detection component 512. This component 512 can receive audio data from a seat-dedicated microphone or from a microphone area and detects whether a wake word is present in the audio data. If so, the wake word engine and zone detection component 512 records the audio data (e.g., the portion starting with the data corresponding to wake word or after the subsequent data and ending when no additional audio data is received). In the case of seat-dedicated microphone, the wake word engine and zone detection component 512 detects a zone from which the audio data has originated. In particular, the audio data can be received along with metadata, where this metadata includes a microphone identifier. The wake word engine and zone detection component 512 can use the microphone identifier in a look-up of configuration data to determine a zone identifier that corresponds to the zone. In the case of a microphone array, the wake word engine and zone detection component 512 also detects a zone from which the audio data has originated. In particular, the audio data can be received along with metadata, where the metadata herein includes an audio beam direction. The wake word engine and zone detection component 512 can use the beam direction in a look-up of configuration data to determine a zone identifier that corresponds to the zone.

Upon the processing of the audio data, the wake word engine and zone detection component 512 can generate an audio context 538 that may be passed to a system on chip (SoC) HAL 530, where this audio context 538 indicates that the wake word is detected and the zone identifier and that the audio is recorded.

As far as the input operations, the audio DSP 510 also implements an echo cancellation (EC) and/or noise reduction (NR), beamforming (BF), and zone interference cancelation (ZIC) component 514. The component 514 can cancel echo and/or reduce the noise in the zone based on the audio that is being output in the zone (e.g., by a speaker associated with the zone). In case of using a microphone array, the component 514 can amplify the audio signal corresponding to the audio beam direction. Based on audio output(s) in the remaining zone(s), the component 514 can cancel the interference of such audio output(s) with the audio that is being output in the zone. The resulting audio data is recorded and can be passed to the SoC HAL 530.

As far as the output operations, the audio DSP 510 implements an equalization (EQ), fade, up-mix, and down-mix component 516. This component 516 can send, as outputs, audio data to the relevant speakers in the zones, shared speakers of the cabin, and/or audio amplifiers of the vehicle. In particular, the component 516 receives input audio data from the SoC HAL 530 and performs EQ, fade, up-mix, and/or down-mix operations thereon to then generate and send output audio data.

The HALs 502 include an audio control HAL 520 and the SoC HAL 530. The audio control HAL 520 provides a layer of programming that enables the processing of external audio streams such as audio alerts generated by other vehicular components (e.g., a safety alert about collision avoidance). The audio control HAL 520 outputs data to an audio focus manager 545 of an audio server 540 of the middleware 540, where this data can set the audio focus (e.g., such that the external audio is presented in the foreground by ducking other audio outputs). The SoC HAL 520 provides a layer of programming that enables the processing of audio contexts and input audio data received from the audio DSP 510 and of output audio data sent to the audio DSP 510. For example, an audio context corresponding to input audio data associated with a zone is stored. The input audio data itself is recorded also. Playback operations can be programmed to send the output audio data.

The middleware 503 includes an audio server 540. In addition to the audio focus manager 545, the audio server 540 includes a zone and routing manager 548. The zone and routing manager 548 can receive configuration data indicating the mapping of devices (e.g., displays, speakers, seat-dedicated microphones) to zones. Based on such configuration data, the zone and routing manager 548 can route output audio data to the zones (e.g., to particular speakers in particular zones by including speaker identifiers in metadata of the output audio data). Further, the audio server 540 can receive and store an audio context 547 from the SoC HAL 530, where this audio context 547 corresponds to the audio context 538 and can pass the audio context 547 in an audio context API 554 of the SDK APIs 504 to an application executing for the relevant zone. Input audio data that was recorded by the SoC HAL 530 can also be received and recorded by the audio server 540 and passed to the application via an audio stream API 552 of the SDK APIs 504. The audio server 540 can pass output audio data to the SoC HAL 530 (e.g., to a playback program), where this output audio data can correspond to audio data received by the audio server 540 from one or more applications. If received from multiple applications, the audio data can be mixed by the audio server 540.

The applications 505 can include sets of applications, where each set is associated with a zone. The sets can be different in size and/or elements. Different types of applications are supported including, for example, communications applications (e.g., phone call applications, messaging applications), smart assistant applications (also referred to as personal assistant applications), navigation applications, music applications, gaming applications, and the like. The audio context can indicate that input audio data includes a wake word and is associated with a zone. In this case, a smart assistant application executing for that zone can receive the input audio data for further processing (where this further processing can be local to the infotainment server and/or can be distributed between the infotainment server and a set of computers as described in connection with FIG. 2). An audio output of an application can be sent to the audio server 540 that then routes it, via the SoC HAL 530 and the audio DSP 510, to the speaker(s) in the proper zone. In particular, the application can be associated with the zone identifier of the zone for which the application is executing. The metadata of the output audio data can include the zone identifier. The zone and routing manager 548 can then determine the speaker identifier(s) and can add such speaker identifier(s) to the metadata for routing purposes.

To illustrate, consider the example of two zones: a first zone 561 and a second zone 562. A communications application 563 for an ongoing communications session with a device external to the vehicle, a smart assistant application 565, and a navigation application 567 are executed for the first zone 561. In this illustration, audio data is recoded 534 by the SoC HAL 530 and corresponds to a request to add the second zone 562 to the communications session. This audio data is also recoded 543 by the audio server 540 that then passes it to the smart assistant application 565. Upon the processing of the audio data, the smart assistant application 565 sends response data (e.g., a text to message (TTS) response) indicating that the requested second zone 562 is about to be added. The response data is sent to a mixer (not shown; possibly including a down or up-sampler, a multiplexer, and/or an encoder-decoder) of the audio server 540 that then passes it, along with a first zone identifier, to a playback program (not shown) of the SoC HAL 530. In turn, the SoC HAL 530 outputs the TTS data to the audio DSP 510 along with the first zone identifier. The audio DSP 510 then further processes the TTS data (e.g., via the EQ, fame, up-mix, and/or down-mix component 516) and outputs it to the relevant speaker(s) of the first zone 561.

In also this illustrative example, navigation data is generated by the navigation application 567 (e.g., indicating an upcoming road exit to take). The navigation data is sent via the audio stream API 552 to a mixer 542 of the audio server 540 and sent, along with a first zone identifier, to a playback program 532 of the SoC HAL 530. In turn, the SoC HAL 530 outputs the navigation data to the audio DSP 510 along with the first zone identifier. The audio DSP 510 then further processes the navigation data (e.g., via the EQ, fame, up-mix, and/or down-mix component 516) and outputs it to the relevant speaker(s) of the first zone 561. In the case when the first zone 561 is a driver zone and the navigation data being relevant to operating the vehicle, the navigation data may not be sent to a speaker of the second zone 562 or to a speaker that is shared across the different zones.

Furthermore, a smart application 568 is executed for the second zone 562 and, thus, is associated with a second zone identifier of the second zone 562. Here, audio data is sent by the audio DSP 510 along with the audio context 538 and corresponds to an acceptance of the communications session in the second zone. The audio data is recorded 536 by the SoC HAL 530. Given than the recoded audio data is passed to the audio server 540 that also records it 546. The audio context 538 is also passed, whereby the audio server 540 determines that the audio data is associated with the second zone. Accordingly, the recorded audio data is passed to the smart assistant application 568 via the audio stream API and the audio context 547 is also passed to the smart assistant application 568 via the audio context API 554. Upon the processing of the audio data, the smart assistant application 568 sends response data (e.g., a TTS response) indicating that the second zone is about to be added and a communications application 564 is executed for the second zone. This TTS response is processed through a mixer 542 of the audio server 540 and then passed to a playback 542 of the SoC HAL 530. The SoC HAL 530 outputs the processed TTS response to the audio DSP 510 along with an identifier of the second zone, where the audio DSP 510 further processes this data (e.g., via the EQ, fame, up-mix, and/or down-mix component 516) and outputs it to the relevant speaker(s) of the second zone 562.

Further, similarly, to the communications application 563, the communications application 564 can receive, process, and send audio data via the audio stream API 552. Outgoing audio data generated by the communications applications 563 and 564 can be mixed by a mixer 544 of the audio server 540 and sent, along with the two zone identifiers, to a transmit program 531 of the SoC HAL 530. In turn, the SoC HAL 530 outputs the mixed audio data to the audio DSP 510 along with the zone identifiers. The audio DSP 510 then further processes the mixed audio data (e.g., via the EQ, fame, up-mix, and/or down-mix component 516) and outputs it to the to a computing component or a device connected to a vehicle interface. Also, each of the two communications applications 563 and 564 sends audio data to be output in the other zone 561 or 562, and this audio data is processed through the audio server 540 and the SoC HAL 530 before being further processed by the audio DSP 510 and routed to the relevant zone 561 or 562.

Figure 6:
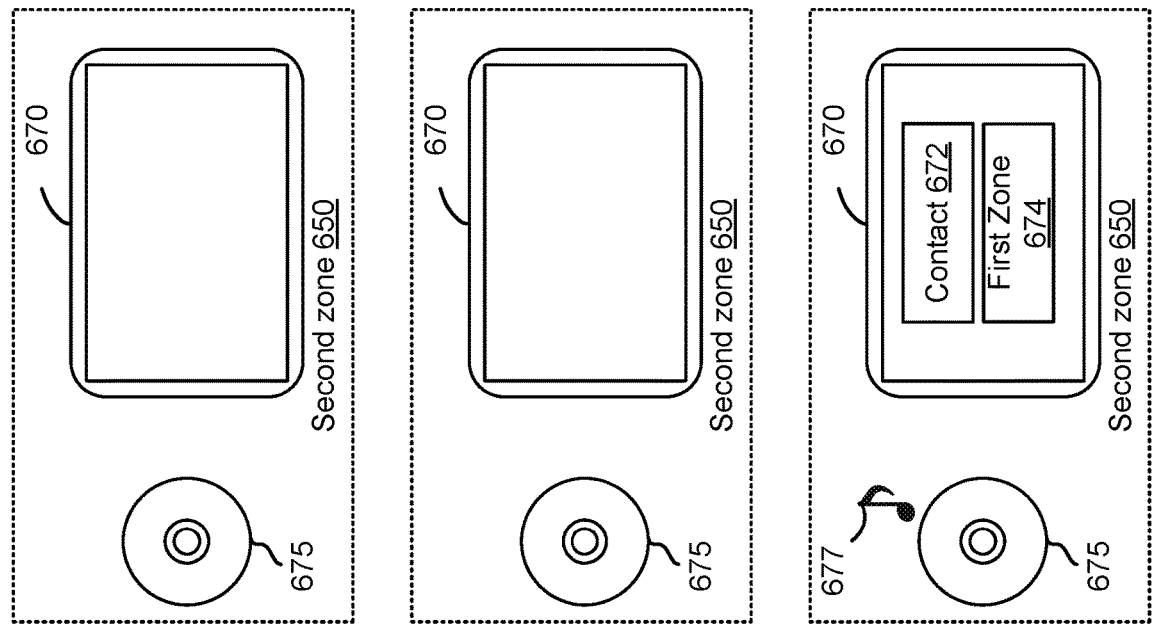
FIG. 6 illustrates an example of adding a second zone to a communications session associated with a first zone, according to embodiments of the present disclosure.
Figure 6:
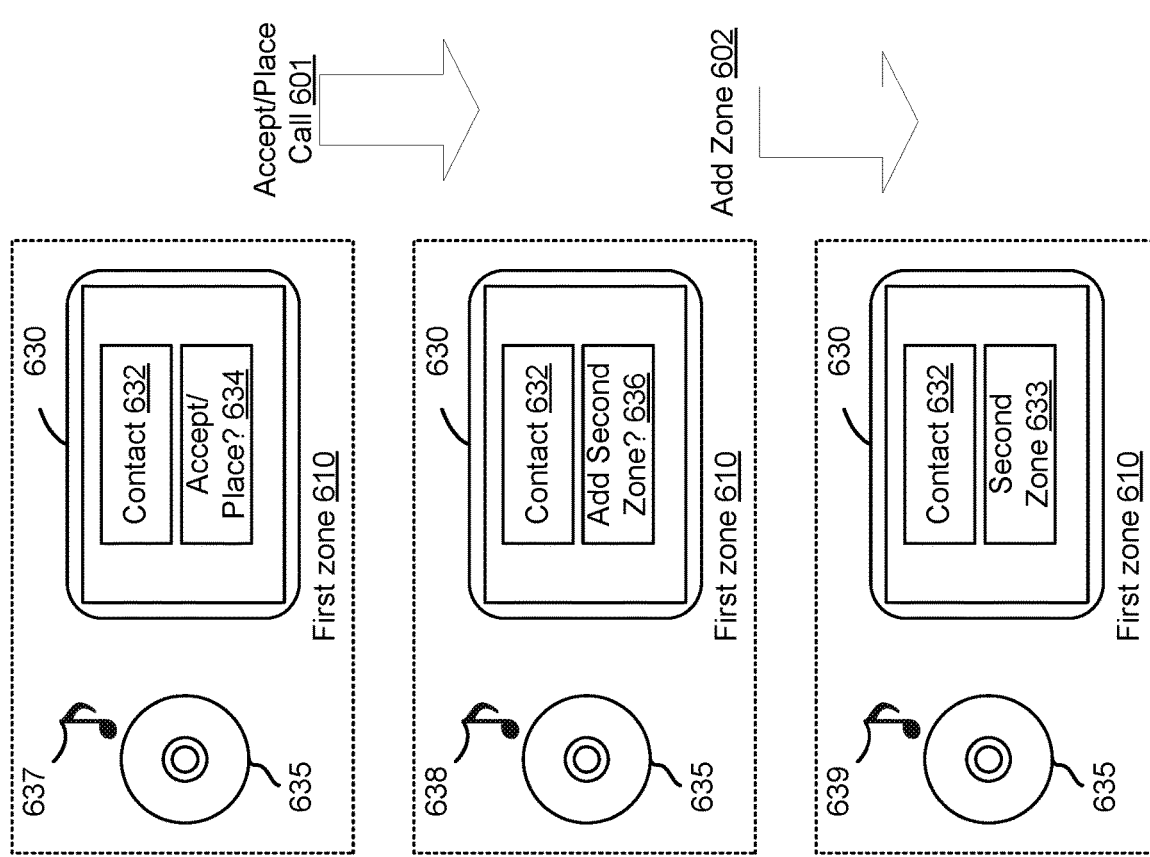

FIG. 6 illustrates an example of adding a second zone 650 to a communications session associated with a first zone 610, according to embodiments of the present disclosure. In the illustration of FIG. 6, GUIs are described as being used to add the second zone 650, whereas input data from a first GUI on a first display 630 in the first zone 610 is received and processed (e.g., by a computing component) to trigger the addition. Although not illustrated, similar input data can be received via a second GUI of a second display 670 of the second zone 650, where this input data can indicate an acceptance to add the second zone. Furthermore, in addition or alternative to using GUIs, voice user interfaces (VUIs) are usable to receive input data in the form of audio data detected by a set of microphones and associated with a zone. This input data can also be processed (e.g., by the computing component) to determine that the first zone 610 is adding the second zone 650 to the communications session and/or an acceptance from the second zone 650 for such addition.

In the illustration of FIG. 6, a first zone 610 is associated with the first display 630 and a first speaker 635. For example, configuration data can be stored (e.g., by the computing component) and can include a first zone identifier of the first zone 610, a first display identifier of the first display 630, and a first speaker identifier of the first speaker 635. The first zone 610 can also be associated with first zone permissions. For example, permission data can be stored (e.g., by the computing component) and can include the first zone identifier and permission identifiers (that can be mapped to permission descriptors that may be stored in a different data store) or the permission descriptors. The permission data can indicate that the first zone 610 is enabled to establish a communications session and to add other zones or specifically the second zone 650, to such a communications session. Operational data can also be stored (e.g., by the infotainment server) and can include the first zone identifier and a session identifier of the communications session.

Similarly, the second zone 650 is associated with a second display 670 and a second speaker 675. For example, configuration data can be stored (e.g., by the computing component) and can include a second zone identifier of the second zone 650, a second display identifier of the second display 670, and a second speaker identifier of the second speaker 675. The second zone 650 can also be associated with second zone permissions 652. For example, permission data can be stored (e.g., by the computing component) and can include the second zone identifier and permission identifiers (that can be mapped to permission descriptors that may be stored in a different data store) or the permission descriptors. The permission data can indicate that the second zone 650 is enabled to be added to a communications session. The second zone 650 can also be associated with operational data including status data of the second zone 650. This status data can indicate status of applications that the computing component may or may not be executing for the second zone. For example, the status data indicate that no communications session is being executed, thereby indicating that non ongoing communications session is associated with the second zone 650.

In operation, a communications session is established and is associated with the first zone 610. For example, an incoming phone call is received and the first display 630 includes, in the first GUI, contact GUI component 632 showing the caller and an operation GUI component 634 to accept or reject the phone call. In addition, audio 637 (e.g., a chime, a ringtone, or some other notification alert can be output) by the speaker 635 to audibly indicate the incoming call. Upon receiving input data from the first display 630 indicating acceptance 601 of the incoming phone call, the computing component updates the operational data to indicate that the first zone is associated with the communications session and facilitates the establishment of the communications session (e.g., by sending the relevant data to the communications component 378) between the caller device and endpoint of the first zone 610 (e.g., the first display 630 and the first speaker 635 or a paired mobile device in addition to the first display 630 and the first speaker 635). This input data can correspond to an interaction with the operation GUI component 634. Alternatively, the input data can be audio data detected by a set of microphones and associated with the first zone 610, where this audio data is further processed to determine that the phone call is accepted. Rather than an incoming phone call, an outgoing phone call can be established in a similar manner. In particular, the contact GUI component 632 shows a contact to call, and the operation GUI component 634 request a phone call to be placed. Additionally or alternatively, audio data detected by the set of microphones and associated with the first zone 610 can be processed to determine a request to initiate a phone call to a particular contact.

Before the acceptance 601 (or the phone call placement), the second zone 650 is not associated with any ongoing communications session as indicated by the operational data. In the illustration of FIG. 6, no application is being executed for the second zone 650 and, as such, no content is being output by the display 670 or the speaker 675.

Upon the acceptance 601 (or the phone call placement), the computing component updates the operational data to indicate that the first zone 610 is associated with the communications session (e.g., the incoming or outgoing call). The first GUI is then updated to show the contact (e.g., caller or callee) in the contact GUI component 632 and GUI component 636 representing an option to add the second zone to the communications session. This second GUI component 636 can be shown given the permission data of the first zone 610 and, possibly, in response to input data (e.g., via the first GUI or audio data) requesting such a component. Although in FIG. 6, this GUI component 636 is shown after the acceptance 601 (or phone call placement), it can be similarly shown before it (e.g., next to or as part of the operation GUI component 634). Up to this point also, the second zone 650 is still not associated with any ongoing communications session or any other relevant application session and, as such, content is still not being output by the display 670 or the speaker 675. The speaker 635 can output audio 638 corresponding to incoming audio data. Outgoing audio data can be generated by the set of microphones, where this data corresponds to audio data determined to be associated with the first zone 610. The outgoing audio data can be sent out.

Upon receiving input data from the first display 630 indicating addition 602 of the second zone 650 to the communications session, the computing component updates the operational data to indicate that the second zone is now also associated with the communications session and facilitates adding a second endpoint of the second zone to the communications session (e.g., by executing a communications application for the second zone 650). This input data can correspond to an interaction with the GUI component 636. Alternatively, the input data can be audio data detected by a set of microphones and associated with the first zone 610, where this audio data is further processed to determine a request for the addition 602. Although not illustrated in FIG. 6, the second GUI can be updated to show the request to add the second zone 650 and/or the speaker 675 can output an audible notification representing such request. Upon receiving input data (e.g., via the second GUI or the relevant audio data) indicating acceptance from the second zone 650 for the addition 602, the computing component can then update the operational data to indicate the association of the second zone 650 with the communications session.

Now that the communications session is associated with both zones, the first and second GUIs are updated to show this association. In particular, the first GUI continues to show contact GUI component 632 and now shows a zone GUI component 633 identifying the second zone 650 (thereby indicating that the second zone 650 is a participant in the communications session). In comparison, the second GUI now shows a contact GUI component 672 identifying the contact and shows a zone GUI component 674 identifying the first zone 610 (thereby indicating that the first zone 610 is a participant in the communications session and/or is the zone that caused the addition 602). Similarly, each of the speakers 635 and 675 can output an audible notification indicating that another zone is a participant or identifying the other zone.

The computing component also mixes the incoming audio data with audio data detected from each zone 610 and 650 and sends the relevant mixed audio data to each speaker 635 and 675. As such, the speaker 635 can output audio 639 corresponding to the incoming audio data and the audio data from the second zone 650. In comparison, the speaker 675 can output audio 677 corresponding to the incoming audio data and the audio data from the first zone 610. Outgoing audio data can be generated by mixed the audio data detected from the zones 610 and 650 and can be sent out.

Figure 7:
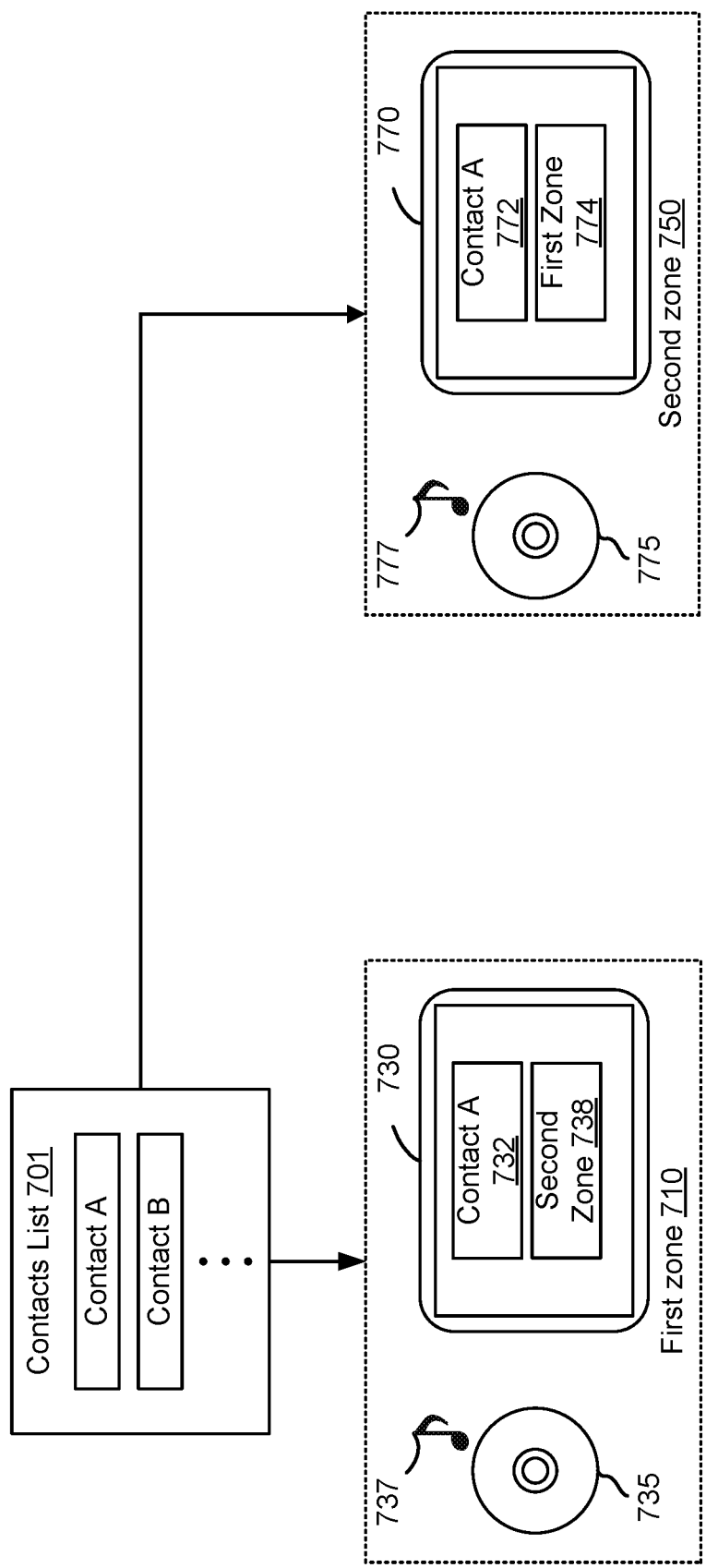
FIG. 7 illustrates an example of identifying a contact in a communications session associated with a first zone and a second zone, according to embodiments of the present disclosure.

FIG. 7 illustrates an example of identifying a contact in a communications session associated with a first zone 710 and a second zone 750, according to embodiments of the present disclosure. A contact can be a caller name in case of an incoming phone call or a callee name in case of an outgoing phone call. A computing component can retrieve the contact from a contacts list associated with one of the zones, such as the first zone 710 in the illustration of FIG. 7. The contact can be identified in a first GUI of a first display 720 in the first zone 710 and in a second GUI of a second display 770 in the second zone 750. The contact can also or alternatively be identified by a first output 739 of a first speaker 737 in the first zone and by a second output 777 of a second speaker 775 in the second zone 750.

In an example, the first zone 710 is designated, in operational data, as a primary zone upon the first zone 710 adding the second zone 750 to the communications session. In comparison, the second zone 750 is designated, in the operational data, as a secondary zone for being an added zone to the communications session.

Given a set of factors, the computing component can determine that only the contacts list associated with the primary zone is to be used to identify the contact in both zones. These factors can include, for instance, permission data limiting the identification of a contact in the secondary zone to be one from a contacts list of the primary zone. These factors can also or alternatively include the unavailability of a contacts list associated with the secondary zone.

Accordingly, the computing component determines a contacts list 701 associated with the first zone 710. Different techniques are possible to determine this contacts list 701. In one example, when a device is paired with a vehicle interface in the first zone 701, the pairing can include checking a permission to transfer of the contacts list 701 from the device to the computing component for storage and transferring the contacts list 701 when the permission is available. The permission can be provided based on input data via the first GUI or audio data associated with the first zone 710 and indicating the permission. The storage can be temporary (e.g., for the time period during which the device is paired, or a predefined time period such as a few days). In another example, profile information of the rider present in the first zone 710 is available from a profile processing component (the component 376 of FIG. 3) and includes the contacts list 701. The computing component can retrieve the contacts list from such profile information.

The computing component can send text data identifying the contact and the second zone 750 to the first display 730 along with a presentation command. In turn, the first display 730 includes, in the first GUI, a contact GUI component 732 identifying the contact (shown in FIG. 7 as "Contact A") and a zone GUI component 738 identifying the second zone 750. Similarly, the computing component can send text data identifying the contact and the first zone 710 to the second display 770 along with a presentation command. In turn, the second display 770 includes, in the second GUI, a contact GUI component 772 identifying the contact in the same manner as the contact GUI component 732 (also shown in FIG. 7 as "Contact A") and a zone GUI component 774 identifying the first zone 710.

In addition or alternative to using the displays 730 and 730, the speakers 735 and 775 can be used. For example, the computing component can send audio data identifying the contact and the second zone 750 to the first speaker 735 along with a presentation command. In turn, the first speaker 735 presents a first output 737 (e.g., audio) identifying the contact and the second zone 750. Similarly, the computing component can send audio data identifying the contact and the first zone 710 to the second speaker 775 along with a presentation command. In turn, the second speaker 775 presents a second output 777 (e.g., audio) identifying the contact in the same manner as the first speaker 735, in addition to identifying the first zone 710.

Although the above example illustrates identifying, in a zone, the other zone participating in the communications session, the embodiments of the present disclosure are not limited as such. For instance, instead of identifying the other zone, a rider present in the other zone can be identified (e.g., based on the pairing of their device with a vehicle interface in the other zone, based on a login via a GUI on a display in the other zone, or based on audio fingerprinting). Profile information of this rider can be accessed to determine a rider identifier to use. Or the rider information can be matched to a contacts list of the other rider in the zone and the matched name can be used instead of or in addition to the other zone identifier.

Figure 8:
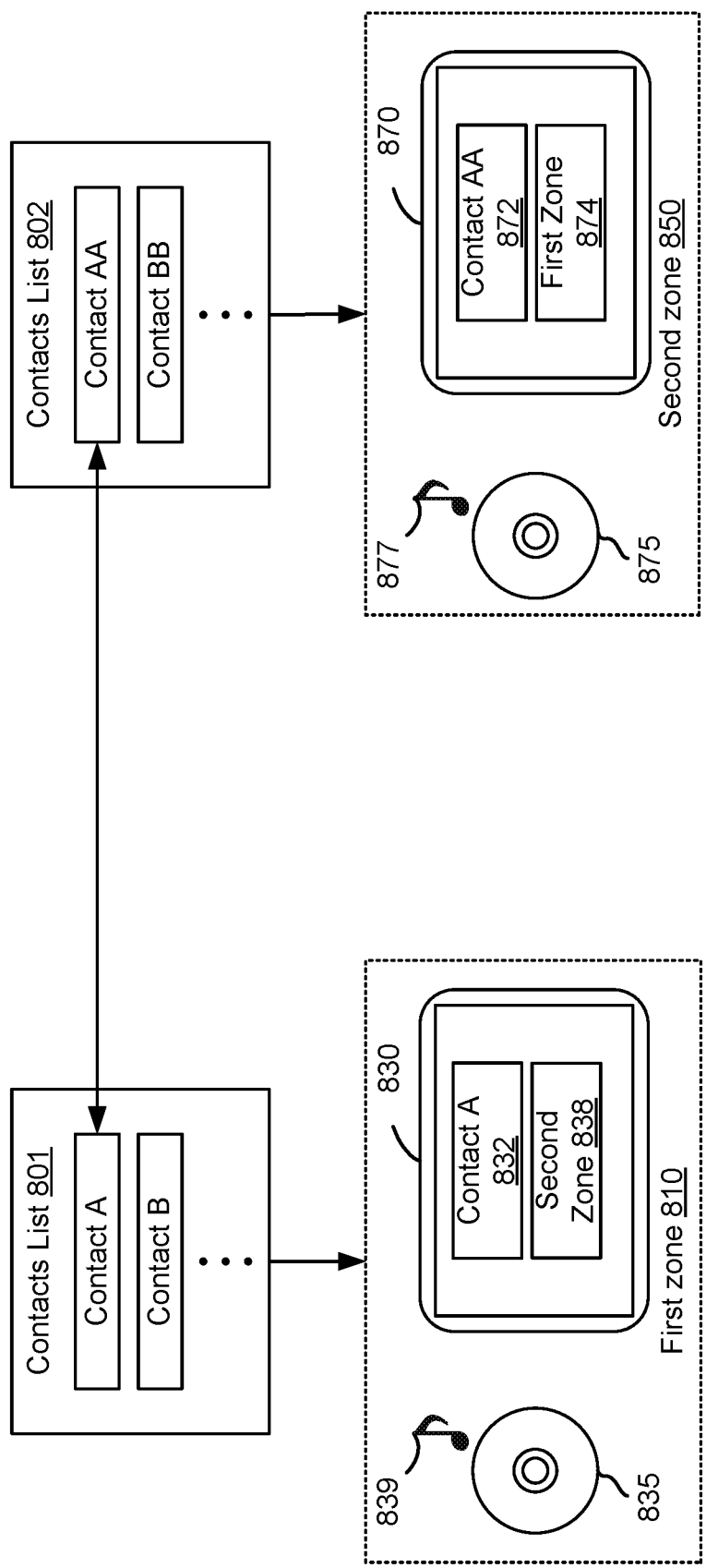
FIG. 8 illustrates another example of identifying a contact in a communications session associated with a first zone and a second zone, according to embodiments of the present disclosure.

FIG. 8 illustrates another example of identifying a contact in a communications session associated with a first zone 810 and a second zone 850, according to embodiments of the present disclosure. Here, each zone can be associated with its own contacts list. In association with each zone, the contact is identified from the corresponding contacts list and identified in a GUI on a display in that zone and/or in an output of a speaker in that zone. Hence, if a callee or a caller is identified differently in the contacts list, the callee or caller is also identified differently by the output(s) in each zone.

Given a set of factors, the computing component can determine that contacts lists associated with the participating zones are to be used. These factors can include, for instance, permission data enabling the identification of a contact in a zone per the contacts list associated with the zone. These factors can also or alternatively include the availability of a contacts list per zone.

Accordingly, the computing component determines a first contacts list 801 associated with the first zone 810 and a second contacts list associated with the second zone 850. Different techniques are possible to determine a contacts list as described herein above. From the first contacts list 801, the computing component determines a first contact name of the caller or callee (shown as "Contact A"). From the second contact list 802, the computing component determines a second contact name of the caller or callee (shown as "Contact AA" and corresponding to a use case where the two contact names are different although they correspond to the same caller or callee (e.g., to same phone number, email address, device identifier, account identifier, etc. of the caller or callee).

The computing component can send text data including the first contact name and identifying the second zone 850 to the first display 830 along with a presentation command. In turn, the first display 830 includes, in the first GUI, a contact GUI component 832 using the first contact name (shown in FIG. 8 as "Contact A") and a zone GUI component 838 identifying the second zone 850. Similarly, the computing component can send text data including the second contact name and identifying the first zone 810 to the second display 870 along with a presentation command. In turn, the second display 870 includes, in the second GUI, a contact GUI component 872 identifying using the first contact name (shown in FIG. 8 as "Contact AA") and a zone GUI component 874 identifying the first zone 810.

In addition or alternative to using the displays 830 and 830, the speakers 835 and 875 can be used. For example, the computing component can send audio data identifying the first contact name and the second zone 850 to the first speaker 835 along with a presentation command. In turn, the first speaker 835 presents a first output 837 (e.g., audio) identifying the first contact and the second zone 850. Similarly, the computing component can send audio data identifying the second contact and the first zone 810 to the second speaker 875 along with a presentation command. In turn, the second speaker 875 presents a second output 877 (e.g., audio) identifying the second contact in the same manner as the first speaker 835, in addition to identifying the first zone 810.

Figure 9:
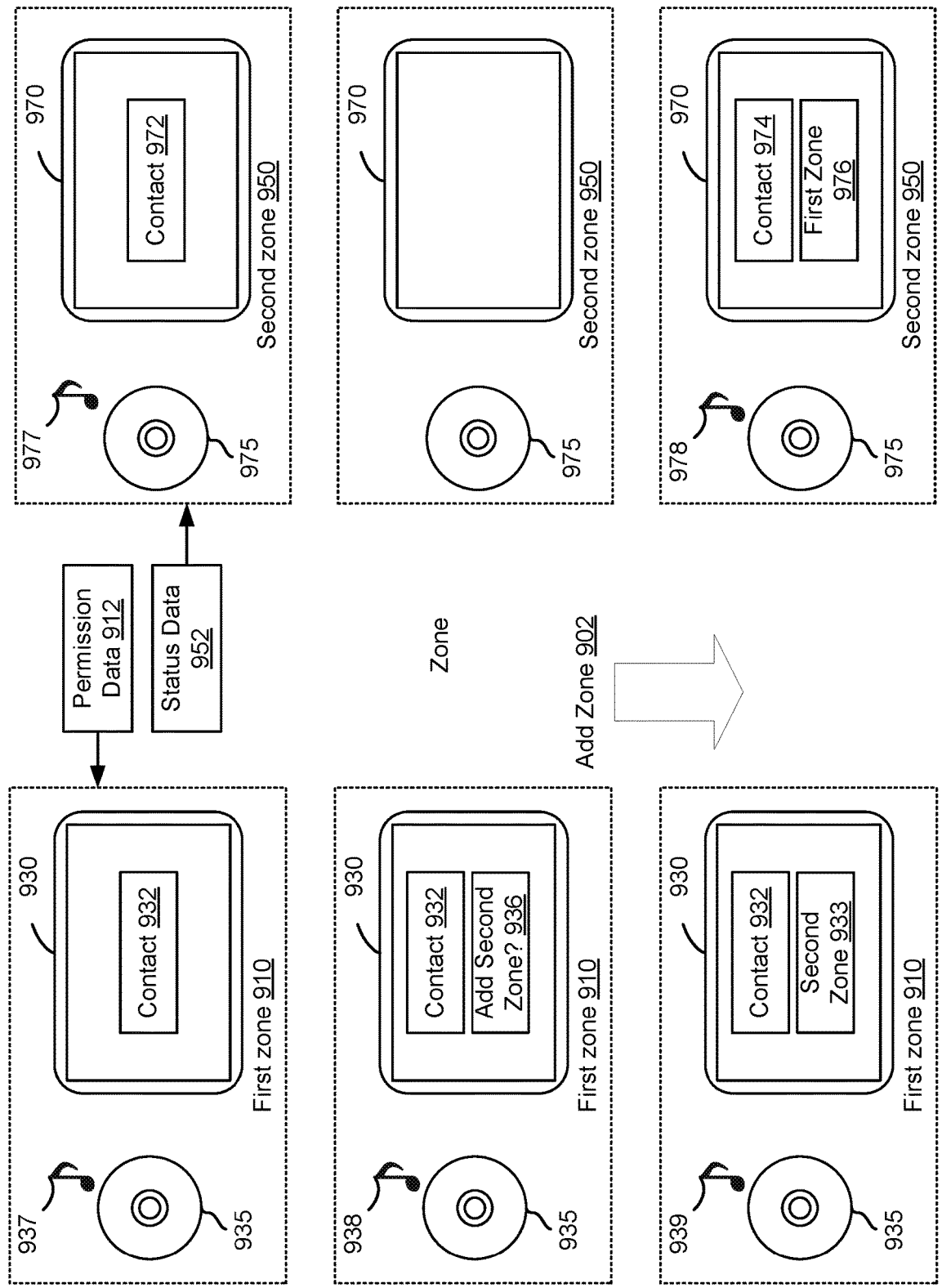
FIG. 9 illustrates an example of using permission data and status data to add a second zone to a communications session associated with a first zone, according to embodiments of the present disclosure.

FIG. 9 illustrates an example of using permission data 912 and status data 952 to add a second zone 950 to a communications session associated with a first zone 910, according to embodiments of the present disclosure. Generally, the permission data 912 can permit the first zone 910 to add the second zone 950 to communications sessions (e.g., to ongoing phone calls). The status data 952 can indicate the status of the second zone 950, where this status can relate to content output in the second zone 950 (e.g., another ongoing phone call in which the second zone 950 is a participant, a music streaming session to the second zone 950, etc.). Depending on the status (when no other phone call is ongoing and/or no music streaming session is ongoing), the first zone 910 can be enabled to add the second zone 950 to a communications session.

In the illustration of FIG. 9, a first communications session is associated with the first zone 910. As such, a first display 930 of the first zone 910 includes a first GUI that includes a contact GUI component 932 identifying a first contact. A first speaker 935 of the first zone 910 also outputs audio 937 corresponding to incoming audio data of the first communications session. Similarly, a second communications session is associated with the second zone 950. As such, a second display 970 of the second zone 950 includes a second GUI that includes a contact GUI component 972 identifying a second contact. A second speaker 975 of the second zone 950 also outputs audio 977 corresponding to incoming audio data of the second communications session.

A computing component can retrieve the permission data 912 of the first zone 910 from a data store by using a zone identifier of the first zone 910 in a data store look-up. The permission data 912 can indicate that the first zone 910 can add (e.g., input data associated with the first zone can trigger addition) of zones (generally) or the second zone 950 (specifically) to communications sessions (generally ongoing in any zone and/or of any type) or to a communications session associated with the first zone 910 (specifically).

The computing component can also retrieve the status data 952 of the second zone 950 from a data store by using a zone identifier of the second zone 950 in a data store look-up. The status data 952 can indicate whether content output is ongoing in the second zone 950 (generally) or a specific type of content output is ongoing in the second zone 950 (e.g., corresponding to an ongoing communications session).

A hierarchical approach can be used to process the permission data 912 and the status data 952. For example, if the permission data 912 indicates that the first zone 910 is not permitted to add the second zone to the first communications session associated with the first zone 910, such addition is not enabled regardless of the status data 952. Otherwise, the status data 952 is checked. If the status data 952 indicates that no ongoing communications session is associated with the second zone or another setting that prohibits the addition of the second zone 950 (e.g., a do not disturb setting, an ongoing music session that a rider of the second zone has indicated to have a higher priority than phone calls, etc.), the computing component can determine that the first zone 910 is enabled to trigger the addition. Otherwise, the determination is negative, whereby the first zone 910 is disabled from triggering the addition.

Figure 11:
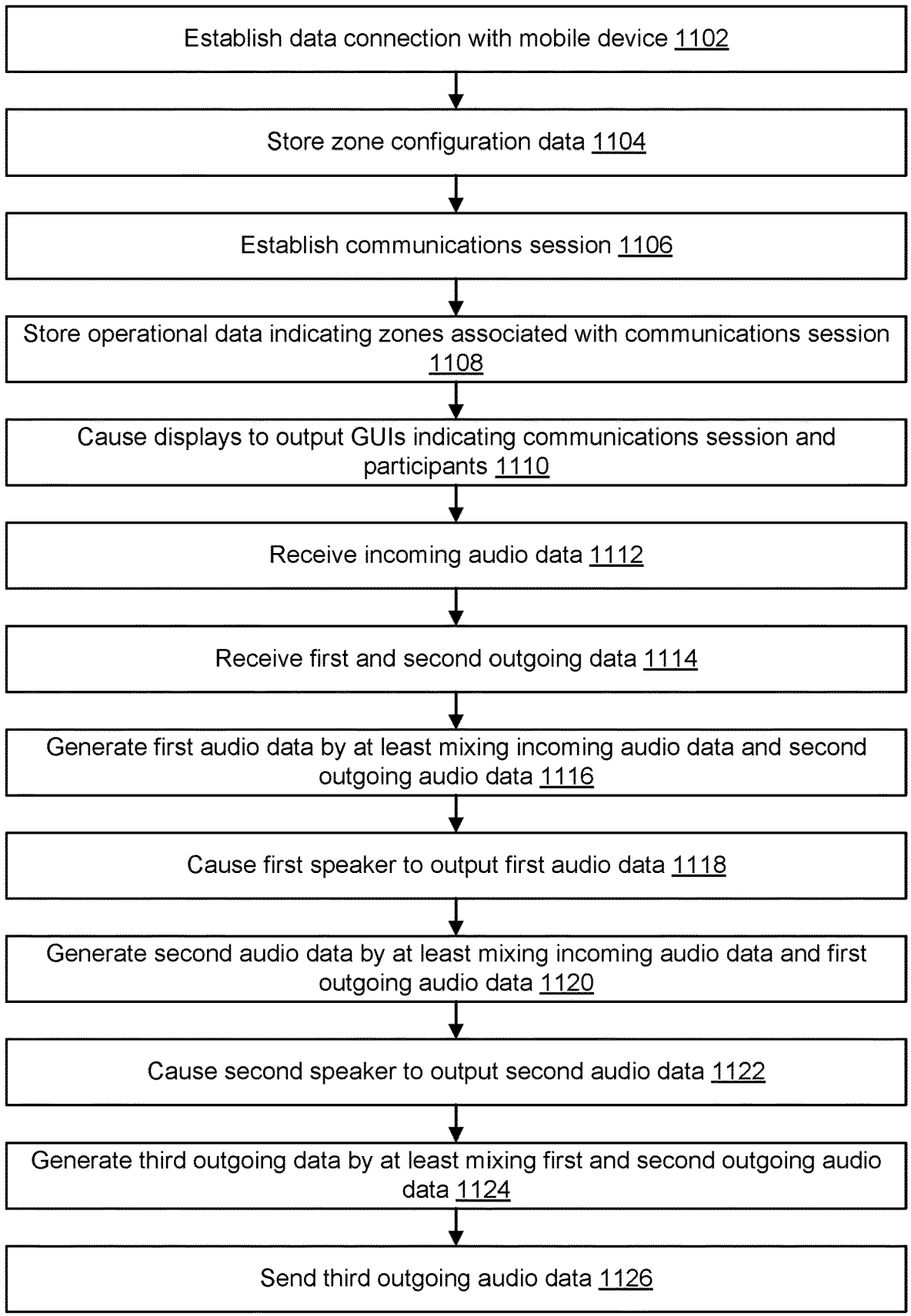
FIG. 11 illustrates an example of a flow for providing multiple zone communications, according to embodiments of the present disclosure.

In the illustration of FIG. 11, because the second communications session is ongoing, the status data 952 indicates that an ongoing communications session status. Thus, the first zone 910 is disabled from triggering the addition.

At some point, the status data 952 is updated (e.g., upon a termination of the second communications session) to then indicate that no ongoing communications session is associated with the second zone 950 (or any other setting or status that prohibits the addition). At this point, the computing component can make a positive determination that the first zone 910 is enabled to trigger the addition. The computing component can be triggered to make this determination based on a number of factors, such as a periodic check, any time the status data 952 is updated, or based on input data associated with the first zone 910 and requesting the addition of the second zone 950.

Next, as illustrated in the middle portion of FIG. 9, the computing component causes updates to the outputs in the two zones 910 and 950. For example, the first GUI additionally presents a zone GUI component 936 that identifies the second zone and that can be selected to trigger the second zone. The first speaker presents an output 938 not only continuing to represent the incoming audio data of the first communications session, but also representing a short (e.g., a second or less) notification (e.g., chime) that the second zone 950 is available for addition. The second display 970 may no longer show that the second communications session is ongoing. The second speaker 975 may also no longer output incoming audio data of the second communications session.

Upon receiving input data from the first display 930 indicating addition 902 of the second zone 950 to the first communications session, the computing component updates operational data to indicate that the second zone is now also associated with the first communications session and facilitates adding the second zone 950 to the communications session (e.g., by executing a communications application for the second zone 950). This input data can correspond to an interaction with the zone GUI component 936. Alternatively, the input data can be audio data detected by a set of microphones and associated with the first zone 910, where this audio data is further processed to determine a request for the addition 902. Although not illustrated in FIG. 9, the second GUI can be updated to show the request to add the second zone 950 and/or the speaker 975 can output an audible notification representing such request. Upon receiving input data (e.g., via the second GUI or the relevant audio data) indicating acceptance from the second zone 950 for the addition 902, the computing component can then update the operational data to indicate the association of the second zone 950 with the first communications session.

Now that the first communications session is associated with both zones 910 and 950, the first and second GUIs are updated to show this association. In particular, the first GUI continues to show contact GUI component 932 and now shows a zone GUI component 933 identifying the second zone 950 (thereby indicating that the second zone 950 is a participant in the communications session). In comparison, the second GUI now shows a contact GUI component 974 identifying the contact and shows a zone GUI component 976 identifying the first zone 910 (thereby indicating that the first zone 910 is a participant in the communications session and/or is the zone that caused the addition 902). Similarly, each of the speakers 935 and 975 can output an audible notification indicating that another zone is a participant or identifying the other zone.

The computing component also mixes the incoming audio data with audio data detected from each zone 910 and 950 and sends the relevant mixed audio data to each speaker 935 and 975. As such, the speaker 935 can output audio 939 corresponding to the incoming audio data and the audio data from the second zone 950. In comparison, the speaker 975 can output audio 977 corresponding to the incoming audio data and the audio data from the first zone 910. Outgoing audio data can be generated by mixed the audio data detected from the zones 910 and 950 and can be sent out.

Figure 10:
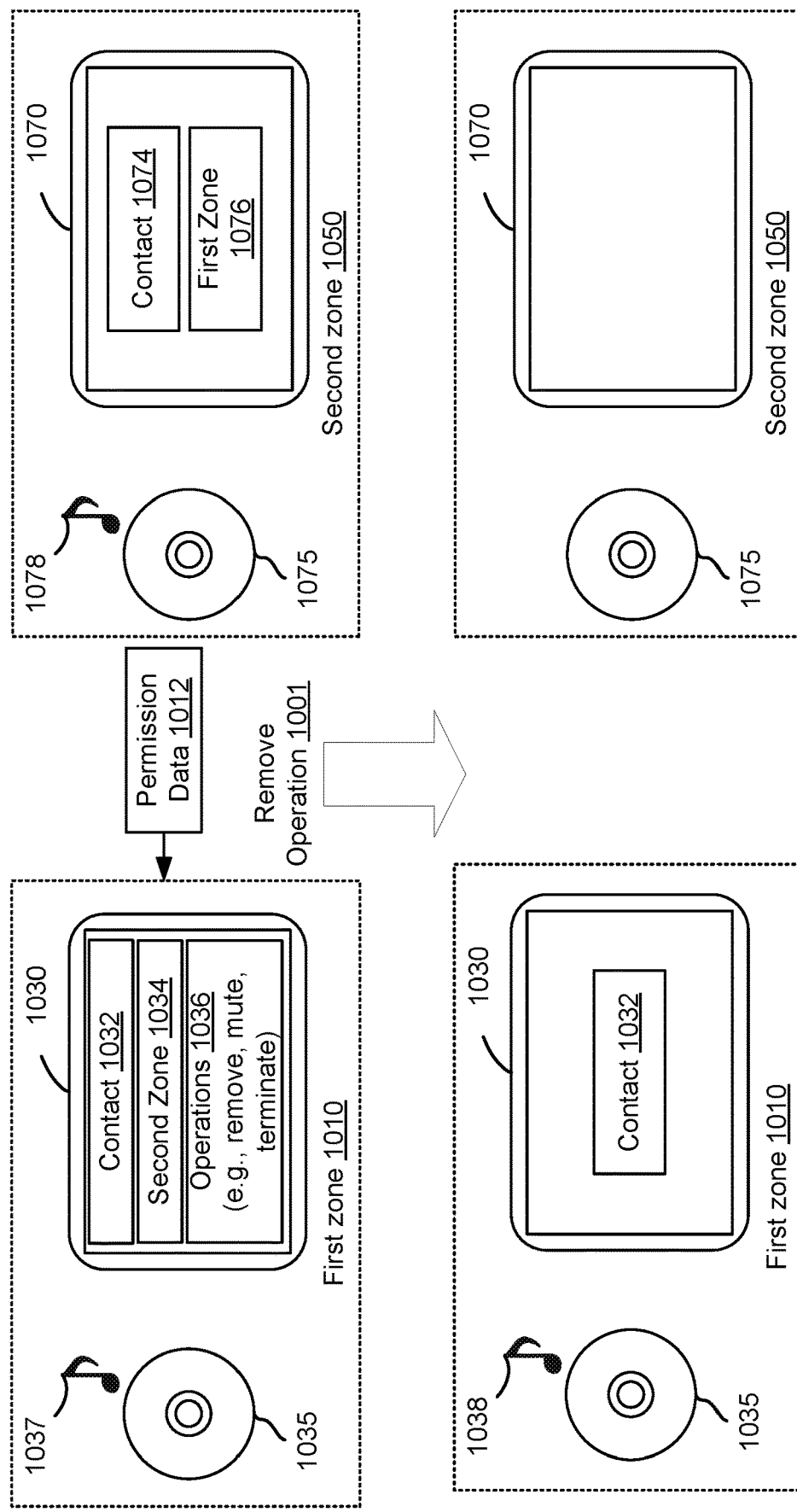
FIG. 10 illustrates an example of using permission data of a first zone to perform an operation related to a second zone associated with a communications session, according to embodiments of the present disclosure.

FIG. 10 illustrates an example of using permission data 1012 of a first zone 1010 to perform an operation related to a second zone 1050 associated with a communications session, according to embodiments of the present disclosure. In the illustration of the FIG. 10, the first zone 1010 is also associated with the communications session, although it may be possible that no such association is needed. The permission data 1012 can indicate that the first zone 910 is enabled to perform a set of operations, such as any or a combination of muting the second zone 1050, removing the second zone 1050 from the communications session, terminating the communications session, and the like. Such permissions can be indicated in the first zone 1010 (e.g., as outputs of a first display 1030 and/or a first speaker 1035 of the first zone 1010). Input data associated with the first zone 1010 can also be processed to trigger at least one of the permitted operations when requested.

Because the communications session is associated with both zones 1010 and 1050, outputs in both zones 1010 and 1050 can indicate the association. In particular, a first GUI of the first display 1030 shows a contact GUI component 1032 identifying a contact and shows a zone GUI component 1032 identifying the second zone 1050 (thereby indicating that the second zone 1050 is a participant in the communications session). In comparison, a second GUI is presented by a second display 1070 in the second zone and shows a contact GUI component 1074 identifying the contact and shows a zone GUI component 1076 identifying the first zone 1010 (thereby indicating that the first zone 1010 is a participant in the communications session and/or is the zone that caused the addition 1002). Similarly, each of the speakers 1035 and 1075 can output an audible notification indicating that another zone is a participant or identifying the other zone in addition to outputting incoming audio data mixed with the audio data from the other zone.

The computing component can retrieve the permission data 1012 of the first zone 1010 from a data store by using a zone identifier of the first zone 1010 in a data store look-up. The computing component can be triggered to retrieve this permission data 1012 based on a number of factors, such as a periodic check, any time operational data is updated, or based on input data associated with the first zone 1010 and requesting the permissions associated with the first zone 1010.

Based on the permission data 1012, the computing component causes the display to include, in the first GUI, one or more operation GUI components 1036 indication the permitted operations. For example, such operation GUI component(s) 1036 can indicate selectable options to remove the second zone 1050 from the communications session, to mute the second zone 1050 while still participating in the communications session, and/or to terminate the communications session for all zones.

In the illustration, a remove operation 1001 is requested. For example, input data is received via the first GUI, corresponds to an interaction with an operation GUI component 1036, and indicates a request to remove the second zone 1050 from the communications session. Additionally or alternatively, the input data includes audio data detected to be from the first zone 1010 and indicating the removal request. In both cases, the computing component processes the input data and performs the remove operation 1001. For example, the operational data is updated to indicate that the second zone 1050 is no longer associated with the communications session (or, in the example of FIG. 10, that only the first zone 1010 is associated with the communications session). Based on this update, the computing component no longer sends audio data to be output by the second speaker 1075, sends a command to the second display 170 to stop presenting the contact GUI component 1074 and the zone GUI component 1076, stops mixing any audio detected from the second zone with the audio output in the first zone 1010 and with the outgoing audio data, and/or terminates the execution of a communications application associated with the second zone 1050. The outputs in the first zone are also updated. For example, the first display 1030 is instructed to no longer shown the zone GUI component 1034 and the operation GUI component(s) 1033 and, possibly, to show instead an option to add the second zone 1050. Further, the first speaker 1035 now presents audio 1038 corresponding to the incoming audio only. Only audio data detected to be from the first zone 1010 is included in the outgoing audio data that is sent out.

Although not illustrated in FIG. 10, a mute operation causes the computing component to instruct a dedicated microphone of the second 1050 to mute and/or to stop mixing audio data detected to be from the second zone 1050 (e.g., by using a microphone array) with the incoming audio data and/or with audio data detected to be from the first zone 1010. The computing component can also cause the speaker 1075 and/or the display 1070 to present a notification of the muting. The operational data can also be updated to indicate that the second zone 1050 is in a muted state.

Also although not illustrated in FIG. 10, a termination operation causes the computing component to terminate the communications session. For example, the computing component updates the operational data to indicate a terminated state of the communications session and to indicate that the first zone 1010 and the second zone 1050 are no longer associated with the communications session. Further, the computing component no longer sends audio data to be output by each speaker 1035 and 1075, sends a command to each display 1030 and 1070 to stop GUI components, stops mixing any audio detected from the zones 1010 and 1050, stops sending outgoing audio data, and/or terminates the execution of a communications application associated with each zone 1010 and 1050.

Referring back to FIGS. 6-10, when two zones are participants in a same communications session, the related operations can be part of a multiple zone mode. In this mode, visual outputs and, possibly, audible outputs are presented in both zones to indicate the multiple zone mode and related controls. In particular, the presentations by GUIs can be coordinated, whereby each GUI indicates the same contact and the participation of the other zone in a manner similar to how the other GUI presents this output. At least one GUI (e.g., in the zone designated as a primary zone) provides operational controls. Similar output presentations can be provided by using the speakers in the zone. In addition, audio data detected from the two zones can be mixed to generated outgoing audio data, whereas audio data detected from the remaining zone(s) can be suppressed such that it is excluded from the outgoing audio data and from being mixed with the incoming audio data. Optionally, the audio data detected from one of the participating zone can be mixed with the incoming audio data and the mixed audio data can be output by the speaker(s) in the other participating zone. When the two zones are no longer participants in the same communications session and, instead, each zone is associated with its own communications session, the related operations can be part of an individual zone mode in each zone. Here, the visual and/or audible outputs need not be similar or coordinated. Instead, each zone can have its own set of notifications and controls. Further, the incoming audio data to a zone is not mixed with audio data detected to be from another zone. And the audio data detected from the zone is not mixed with the audio data detected to be from another zone to generate outgoing audio data.

FIGS. 11-14 illustrate example flows for multiple zone communications. Operations of the flows can be performed by a computing component, such as the computing component described herein above in connection with FIGS. 1-4. Some or all of the instructions for performing the operations can be implemented as hardware circuitry and/or stored as computer-readable instructions on a non-transitory computer-readable medium. As implemented, the instructions represent components that include circuitry or code executable by processor(s). The use of such instructions configures the computing component to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 11 illustrates an example of a flow for providing multiple zone communications, according to embodiments of the present disclosure. As illustrated, the flow may start at operation 1102, where the computing component establishes a data connection with a mobile device. For example, the mobile device can be located within a first zone of a vehicle (or some other space that includes the computing component) and can connect with a vehicle interface. The mobile device with at least one of a first display in the first zone, a first speaker in the first zone, or a set of microphones can be considered a first endpoint. This operation 1102 may be optional, whereby a mobile device need not be used, and the first endpoint can include at least one of the first display, the first speaker, or the set of microphones.

The example flow can also include operation 1104, where the computing component stores zone configuration data. For instance, this data includes and associates a device identifier of the mobile device (when connected per operation 1102), a first display identifier of the first display, a first speaker identifier of the first speaker, a microphone identifier of a dedicated microphone (in case the set of microphones includes the dedicated microphone), an audio beam direction (in case of a microphone array), a vehicle interface identifier of the vehicle interface, and a first zone identifier of the first zone. A second zone can exist in the vehicle (or the space), and the configuration data can also indicate the device-to-zone configuration of this second zone.

The example flow can also include operation 1106, where the computing component establishes a communications session. For example, the communications session can be established between the first endpoint and a device located outside of the vehicle (or the space) and can correspond to an incoming phone call to the first zone or an outgoing phone call from the first zone. At some point (e.g., while the communications session is being established or afterwards), a second endpoint of the second zone is added to the communications session, such that the second zone is considered to be a participant in the communications session.

The example flow can also include operation 1108, where the computing component stores operational data indicating zones associated with the communications session. For example, the operational data includes the first zone identifier, a second zone identifier of the second zone, and a session identifier of the communications session.

The example flow can also include operation 1110, where the computing component causes displays to output GUIs indicating the communications session and participants in the communications session. For example, based on the operational data indicating that the first zone and the second zones are associated with the communications session and based on the zone configuration data indicating that the first display is associated with the first zone and a second display is associated with the second zone, the computing component sends data and presentation comments to these two displays. In turn, the first display presents a first GUI that identifies a contact (e.g., a caller or a callee) and the second zone and possibly including other information (e.g., the type of communications session, an identifier of the rider in the second zone, etc.). The second display also presents a second GUI that shows similar information.

The example flow can also include operation 1112, where the computing component receives incoming audio data. For example, this incoming audio data is generated by the device and is received over a data network.

The example flow can also include operation 1114, where the computing component receives first outgoing audio data and second outgoing audio data. The first outgoing audio data corresponds to audio detected to be from the first zone, whereas the second outgoing audio data corresponds to audio detected to be from the second zone. Audio data corresponding to audio detected from any other zone of the vehicle (or the space) can be suppressed for the purpose of audio processing associated with the communications session.

The example flow can also include operation 1116, where the computing component generates first audio data by at least mixing the incoming audio data and the second outgoing audio data. For example, digital signal processing techniques are used to combine the two audio inputs into a single audio stream and such techniques can include downsampling or up-sampling such that both inputs have the same bit resolution, equalization, compression, and the like.

The example flow can also include operation 1118, where the computing component causes the first speaker to output the first audio data. For example, based on the operational data indicating that the first zone is associated with the communications session and based on the zone configuration data indicating that the first speaker is associated with the first zone, the first audio data is sent to the first speaker.

The example flow can also include operation 1120, where the computing component generates second audio data by at least mixing the incoming audio data and the first outgoing audio data. Here also, digital signal processing techniques are used to combine the two audio inputs into a single audio stream.

The example flow can also include operation 1122, where the computing component causes a second speaker to output the second audio data. For example, based on the operational data indicating that the second zone is associated with the communications session and based on the zone configuration data indicating that the second speaker is associated with the second zone, the second audio data is sent to the second speaker.

The example flow can also include operation 1124, where the computing component generates third outgoing audio data by at least mixing the first outgoing audio data and the second outgoing audio data. Here also, digital signal processing techniques are used to combine the two audio inputs into a single audio stream.

The example flow can also include operation 1126, where the computing component sends the third outgoing audio data. In case the mobile device being connected in the first zone, the third outgoing audio data is sent to the mobile device that then sends it to the device. Otherwise, the computing component sends the third outgoing audio data to the device over one or more networks.

Figure 12:
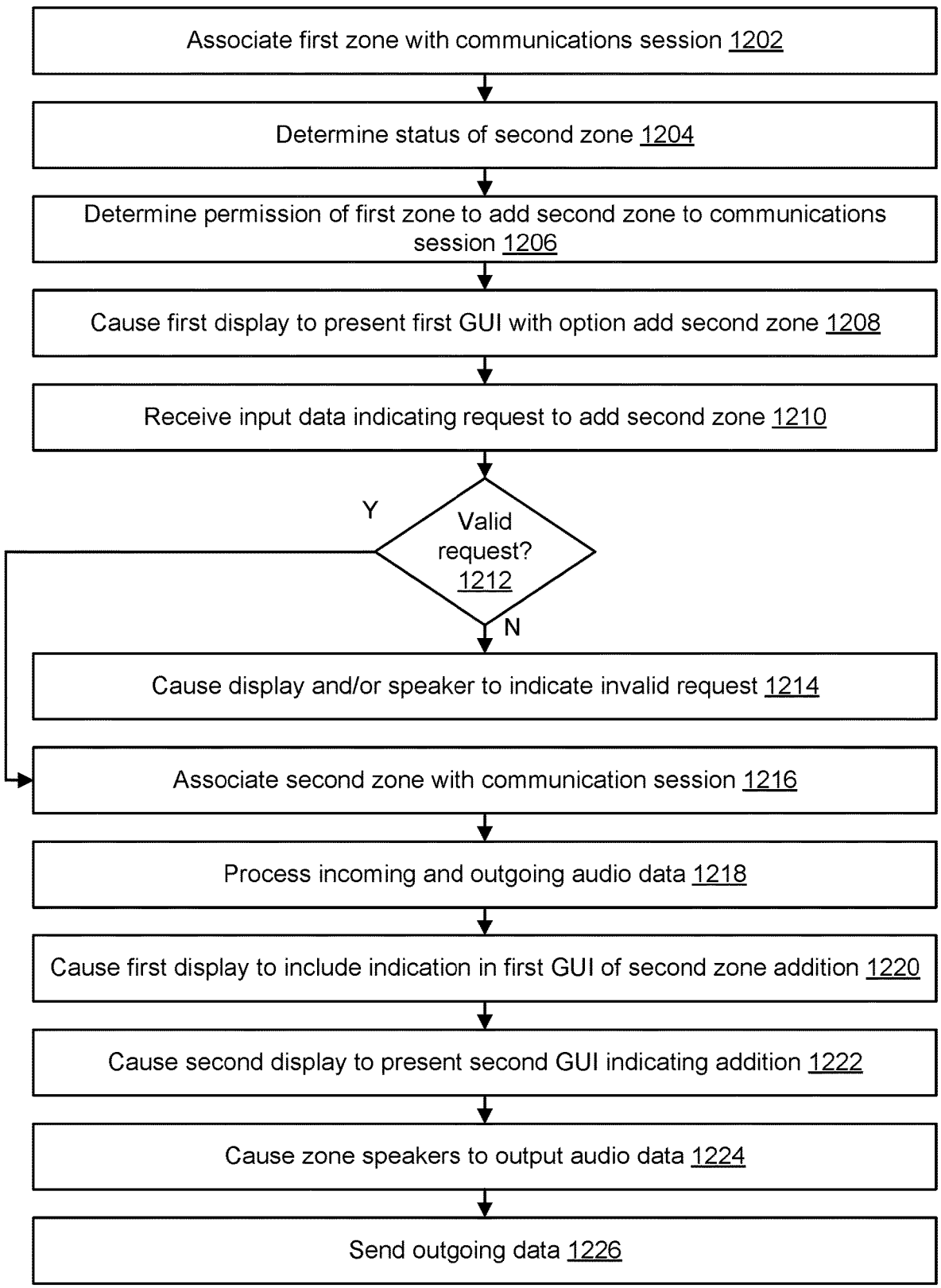
FIG. 12 illustrates an example of a flow for adding a second zone to a communications session associated with a first zone, according to embodiments of the present disclosure.

FIG. 12 illustrates an example of a flow for adding a second zone to a communications session associated with a first zone, according to embodiments of the present disclosure. As illustrated, the flow may start at operation 1202, where the computing component associates a first zone with a communications session. For example, this association is included in operational data maintained for multiple zones.

The example flow can also include operation 1204, where the computing component determines a status of a second zone. For example, this status is determined by using a second zone identifier of the second store in a look up of the operational data. The operational data can include status data associated with each zone. The status data of the second zone is then retrieved to determine that the second zone is not associated with an ongoing communications session.

The example flow can also include operation 1206, where the computing component determines a permission of the first zone to add the second zone to the communications session. For example, permission data is looked up by using a first zone identifier of the first zone, where this data indicates the permissions per zone. The look-up result indicates that the first zone is enabled to trigger the addition.

The example flow can also include operation 1208, where the computing component causes a first display of the first zone to present a first GUI with an option to add the second zone. For example, based on the status data associated with the second zone and the permission data associated with the first zone, the computing component determines that the addition can be triggered. Based on zone configuration data indicating that the first display is associated with the first zone, the computing component sends a command to the first display to include, in the first GUI, a GUI component that shows the option and that can be interacted with to request the addition.

The example flow can also include operation 1210, where the computing component receives input data indicating the request to add the second zone to the communications session. In an example, the input data is sent by the first display based on an interaction with the GUI component. In another example, the input data is audio data detected by a set of microphones.

The example flow can also include operation 1212, where the computing component determines whether the request is valid. In case the input data is received from the first display, the request is determined to be valid. In case audio data is received, the request is valid only if the audio data is associated with the first zone. Otherwise, the request is invalid. Operation 1214 can be performed when the request is invalid. Operation 1216 can be performed when the request is valid.

The example flow can also include operation 1214, where the computing component causes a display and/or a speaker to indicate an invalid request. Here, the audio data is detected to be associated with a different zone. Based on the zone configuration indicating that a different display and a different speaker are associated with the difference zone, the computing component sends text data to such a display and/or audio data to such a speaker for presentation, where the presentation indicates the invalidity.

The example flow can also include operation 1216, where the computing component associates the second zone with the communications session. For example, the operational data is updated to associate a second zone identifier of the second zone with the session identifier of the communications session.

The example flow can also include operation 1218, where the computing component processes incoming audio data and outgoing audio data. The audio processing can be similar to the processing described in FIG. 11.

The example flow can also include operation 1220, where the computing component causes the first display to include an indication in the first GUI of the addition of the second zone. For example, an identifier or a descriptor of the second zone is sent to the first display that then presents it in a GUI component.

The example flow can also include operation 1222, where the computing component causes a second display of the second zone to include an indication in a second GUI of the addition of the second zone. For example, based on the operational data indicating that the second zone is associated with the communications session and based on the zone configuration data indicating that the second display is associated with the first zone, the computing component sends an identifier or a descriptor of the second zone along with a presentation command to the second display that then presents the second GUI and include a GUI component that indicates the first zone.

The example flow can also include operation 1224, where the computing component causes speakers of the two zones to output audio data. This operation 1224 can be similar to the audio outputs described in FIG. 11.

The example flow can also include operation 1226, where the computing component sends outgoing audio data. This operation 1226 can be similar to the audio transmission described in FIG. 11

Figure 13:
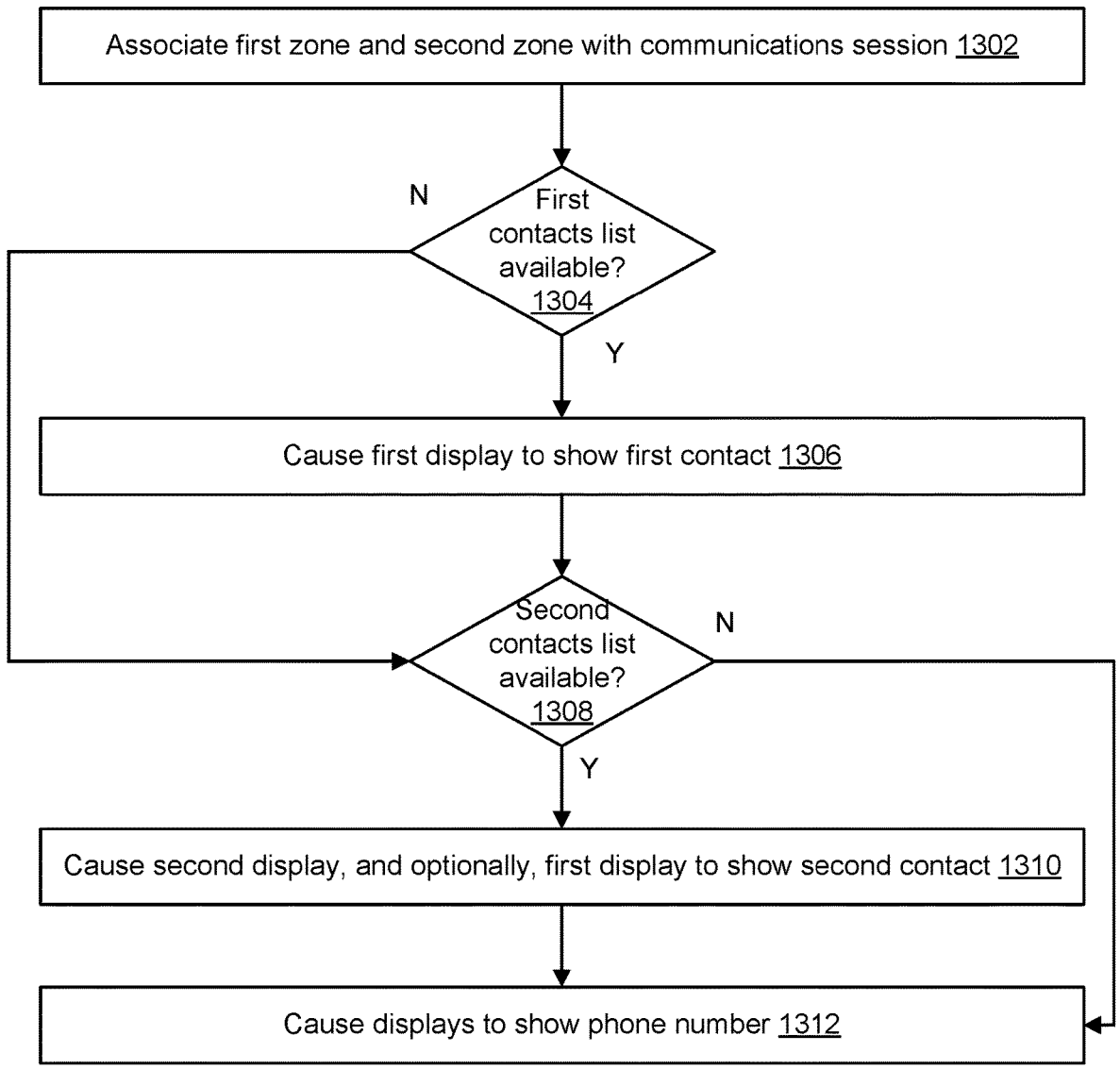
FIG. 13 illustrates an example of a flow for identifying a contact in a communications session associated with a first zone and a second zone, according to embodiments of the present disclosure.

FIG. 13 illustrates an example of a flow for identifying a contact in a communications session associated with a first zone and a second zone, according to embodiments of the present disclosure. As illustrated, the flow may start at operation 1302, where the computing component associates a first zone and a second zone with a communications session. For example, this association is included in operational data maintained for multiple zones.

The example flow can also include operation 1304, where the computing component determines whether a first contacts list associated with the first zone is available. For example, the computing component can use a first zone identifier of the first zone to look up contacts lists stored a data store local to the computing component and/or in a data store accessible via a data network. If the look-up result is null, no contacts list is identified and operation 1304 can follow operation 1304. Otherwise, operation 1306 can follow operation 1304.

The example flow can also include operation 1306, where the computing component causes a first display to show a first contact. For example, the first display is in the first zone. The first contact is identified from the first contacts list as an identifier of a caller (in case of an incoming call) or as an identifier of a callee (in case of an outgoing call). The computing component sends the identifier to the first display for presentation in a first GUI.

The example flow can also include operation 1308, where the computing component determines whether a second contacts list associated with the second zone is available. For example, the computing component can use a second zone identifier of the second zone to look up the stored contacts lists. If the look-up result is null, no contacts list is identified and operation 1312 can follow operation 1308. Otherwise, operation 1310 can follow operation 1308.

The example flow can also include operation 1310, where the computing component causes a second display, and optionally the first display, to show a second contact. For example, the second display is in the second zone. The second contact is identified from the second contacts list as an identifier of a caller or callee. The computing component sends the identifier to the second display for presentation in a second GUI. Optionally, the computing component also send the identifier to the first display for presentation in the GUI. Alternatively, the computing component sends a phone number (or some other non-contacts list identifier) of the caller or callee to the first display for presentation in the first GUI.

The example flow can also include operation 1312, where the computing component causes the displays to present the phone number (or some other non-contacts list identifier). For example, this phone is sent to each of the two displays for presentation in the corresponding GUI.

Figure 14:
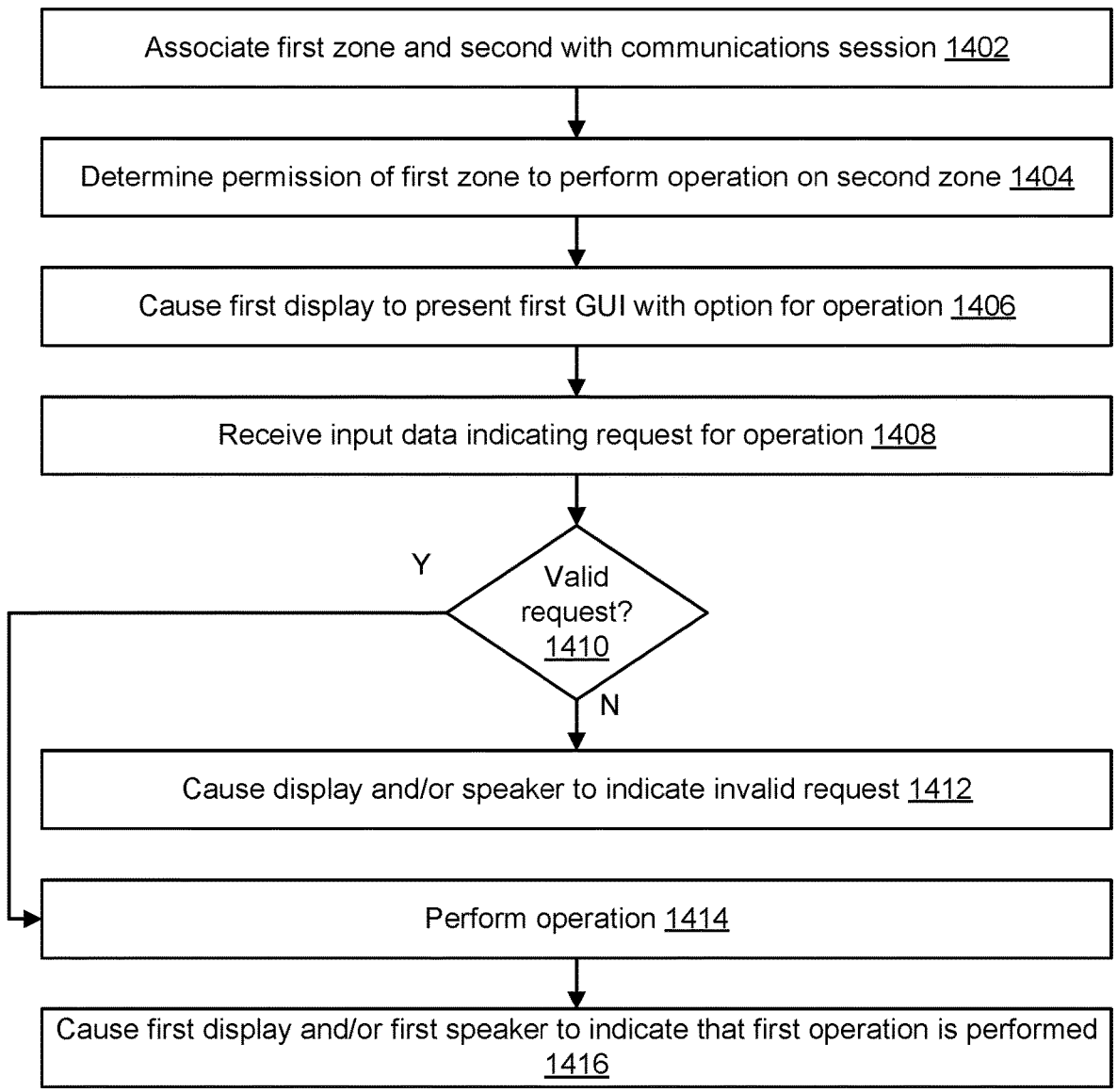
FIG. 14 illustrates an example of a flow for performing an operation related to a second zone associated with communications session, according to embodiments of the present disclosure.

FIG. 14 illustrates an example of a flow for performing an operation related to a second zone associated with communications session, according to embodiments of the present disclosure. As illustrated, the flow may start at operation 1402, where the computing component associates a first zone and a second zone with a communications session. For example, this association is included in operational data maintained for multiple zones.

The example flow can also include operation 1404, where the computing component determines a permission of the first zone to perform an operation on the second zone, where the operation is related to the communications session. For example, permission data is looked up by using a first zone identifier of the first zone, where this data indicates the permissions per zone. The look-up result indicates that the first zone is enabled to trigger one or more operations, such as muting the second zone, removing the second zone from the communications session, or terminating the communications session.

The example flow can also include operation 1406, where the computing component causes a first display in the first zone to present a first GUI with an option to request the operation. For example, a presentation command is sent to the first display to present a GUI component that represents the option.

The example flow can also include operation 1408, where the computing component receives input data indicating a request for the operation. In an example, the input data is sent by the first display based on an interaction with the GUI component. In another example, the input data is audio data detected by a set of microphones.

The example flow can also include operation 1410, where the computing component determines whether the request is valid. In case the input data is received from the first display, the request is determined to be valid. In case audio data is received, the request is valid only if the audio data is associated with the first zone. Otherwise, the request is invalid. Operation 1412 can be performed when the request is invalid. Operation 1414 can be performed when the request is valid.

The example flow can also include operation 1412, where the computing component causes a display and/or a speaker to indicate an invalid request. Here, the audio data is detected to be associated with a different zone. Based on the zone configuration indicating that a different display and a different speaker are associated with the difference zone, the computing component sends text data to such a display and/or audio data to such a speaker for presentation, where the presentation indicates the invalidity.

The example flow can also include operation 1414, where the computing component performs the operation. For example, if the operation is to mute the second zone, the computing component no longer sends audio data to be presented in the second zone and/or no longer mix audio data detected to be from the second zone with other audio data. In case of a removal operation, the operational data is updated to disassociate the second zone from the communications sessions, and the computing component no longer sends audio data to be presented in the second zone and suppress audio data detected to be from the second zone. In the case of a communications session termination, the communications session is terminated for both zones.

The example flow can also include operation 1416, where the computing component causes the first display and/or a first speaker in the first zone to indicate that the operation is performed. For example, the computing component sends text data about the operation to the first display and/or audio data about the operation to the first speaker for presentation thereat.

Figure 15:
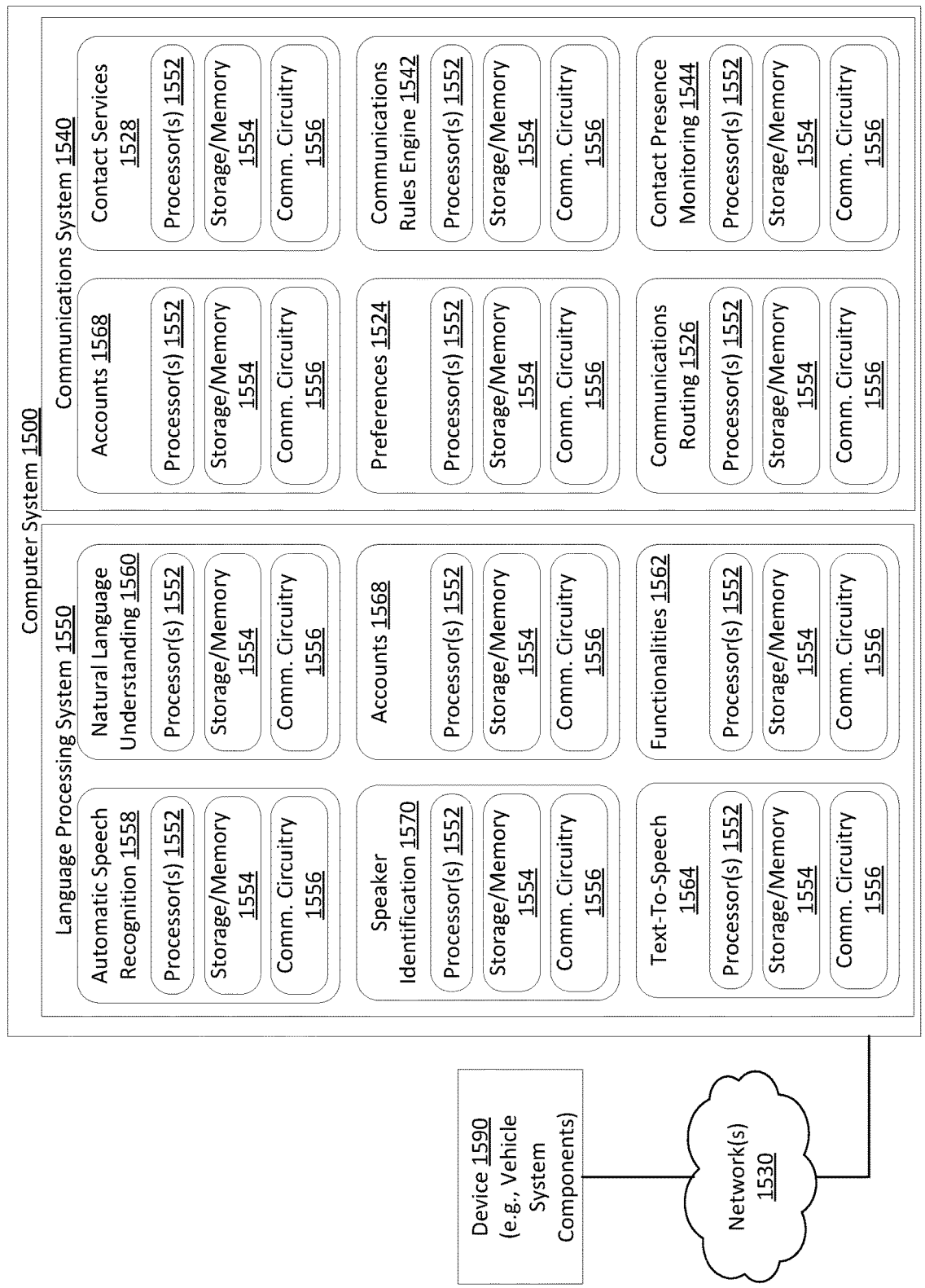
FIG. 15 illustrates an example system architecture, according to certain embodiments of the present disclosure.

FIG. 15 illustrates an example system architecture, according to certain embodiments of the present disclosure. As illustrated, a device 1590 may be configured to communicate with a computer system 1500, and in particular with a language processing system 1550, in response to detecting an utterance including a wake word, which may subsequently be followed by a request/question/statement. Similarly, the device 1590 may alternatively or additionally include one or more manually activated components for manually activated capabilities. In this particular scenario, the device 1590 may also be configured, in some embodiments, to communicate with the language processing system 1550, in response to a manual input being detected by one or more input mechanisms, such as a touch screen, a button, and/or a switch, for example. The computer system 1500 can include set of computers 370 of FIG. 3. The device 1590 can include some or all of the components of a computing component described herein above.

In non-limiting embodiments, the device 1590 may be capable of being activated in response to detecting a specific sound, such as a wake word. After detecting a specific sound (e.g., a wake word or trigger expression), the device 1590 may recognize commands (e.g., audible commands, inputs) within captured audio, and may perform one or more actions in response to the received commands. Furthermore, the device 1590 may also be configured to perform one or more actions in response to detecting a particular touch, or mechanical, input(s) via the device 1590.

The device 1590, in some embodiments, may include a minimal number of input mechanisms (e.g., a power on/off switch) such that functionality of the device 1590 may solely or primarily be through audio input and audio output. For example, the device 1590 may include, or be in communication with, one or more microphones that listen for a wake word by continually monitoring local audio. In response to the wake word being detected, the device 1590 may establish a connection with the language processing system 1550 (such as through a network(s) 1530), send audio data to the language processing system 1550, and await/receive a response from the language processing system 1550. In some embodiments, however, non-voice/sound activated devices may also communicate with the language processing system 1550 (e.g., push-to-talk devices). For example, in response to a button or touch screen being pressed, or a button or touch screen being pressed and held, a microphone associated with the device 1590 may begin recording local audio, establish a connection with the language processing system 1550, send audio data representing the captured audio to the language processing system 1550, and await/receive a response, and/or action to be occur, from the language processing system 1550.

It may be recognized that although in the illustrative embodiment shown in FIG. 15, the computer system 1500 includes the language processing system 1550, this is merely exemplary, and the language processing system 1550 may be separate from the computer system 1500. For example, the language processing system 1550 may be located within a dedicated computing device (such as one or more separate server(s), or within the device 1590) or computing system, which may or may not be in communication with the computer system 1500 and/or one or more additional devices.

In some embodiments, the device 1590 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

Microphones associated with the device 1590 may receive audio input signals, which in turn may be sent to the language processing system 1550 in response to a wake word engine of the device 1590 determining that a wake word was uttered.

Processors of the device 1590 may include any suitable processing circuitry capable of controlling operations and functionality of the device 1590, as well as facilitating communications between various components within the device 1590. In some embodiments, the processor(s) may include a central processing unit ("CPU"), a graphic processing unit ("GPU"), one or more microprocessors, a digital signal processor, or any other type of processor, or any combination thereof. In some embodiments, the functionality of the processor(s) may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of the processor(s) may include its own local memory, which may store program systems, program data, and/or one or more operating systems. However, the processor(s) may run an operating system ("OS") for the device 1590, and/or one or more firmware applications, media applications, and/or applications resident thereon. In some embodiments, the processor(s) may run a local client script for reading and rendering content received from one or more websites. For example, the processor(s) may run a local JavaScript client for rendering HTML or XHTML content received from a particular URL accessed by the device 1590.

The storage/memory of the device may include one or more types of storage mediums such as any volatile or non-volatile memory, or any removable or non-removable memory implemented in any suitable manner to store data for the device 1590. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the storage/memory may be implemented as computer-readable storage media ("CRSM"), which may be any available physical media accessible by processor(s) to execute one or more instructions stored within the storage/memory. In some embodiments, one or more applications (e.g., communications, gaming, music, video, calendars, lists, etc.) may be run by the processor(s) and may be stored in the memory.

In some embodiments, the storage/memory may include a media system, which may be configured to facilitate communications between the device 1590 and the computer system 1500. For example, the media system may store one or more communications protocols that may be executed by the processor(s) for facilitating communications for the device 1590. In some embodiments, a sessions initiation protocol ("SIP") may be used to facilitate media transfer between the device 1590 and one or more of the computer systems and a second device 1590. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for the device 1590. In some embodiments, a Web Real-Time Communications ("WebRTC") protocols may be employed by the device 1590. In a non-limiting embodiment, the media system may include instructions that indicate which communications protocols to employ for facilitating media transfer between devices based on a device type of the device 1590.

In some embodiments, the storage/memory may include one or more systems and/or databases, such as a speech recognition system, a wake word database, a sound profile database, and a wake word detection system. The speech recognition system may, for example, include an automatic speech recognition ("ASR") component 1558 that recognizes human speech in detected audio signals and converts the audio signals to text data. The speech recognition system may also include a natural language understanding ("NLU") component 1560 that determines user intent based on the text data it receives from ASR. Also included within the speech recognition system may be a text-to-speech ("TTS") component 1564 that is capable of converting text to speech to be outputted by the speaker(s) associated with the device 1590, and/or a speech-to-text ("STT") component capable of converting received audio signals into text to be sent to the language processing system 1550 for processing.

The wake word database may be a database stored locally by the storage/memory of the device 1590 and may include a list of a current wake words for the device 1590, as well as one or more previously used, or alternative, wake words for the voice activated device 1590. In some embodiments, an individual may set or program a wake word for their device 1590. The wake word may be programmed directly on the device 1590, or a wake word or wake words may be set by the individual via a local client application that is in communication with computer system 1500 and/or language processing system 1550. For example, an individual may use their mobile device having the speech-processing system application running thereon to set the wake word. The specific wake word may then be communicated from the mobile device to the language processing system 1550, which in turn may send/notify the device 1590 of the individual's selection for the wake word. The selected activation may then be stored in the wake word database of the storage/memory. In some embodiments, additional trigger expressions or permutations of the wake word may also be stored within the storage/memory. For example, specific trigger expressions or words that indicate the presence of the wake word may also be stored within the storage/memory. In some embodiments, audio watermarks, indicating a specific action or message, may also be stored within the storage/memory.

In some embodiments, sound profiles for different words, phrases, commands, or audio compositions are also capable of being stored within the storage/memory, such as within a sound profile database. For example, a sound profile of audio may be stored within the sound profile database of the storage/memory on the device 1590. In this way, if a particular sound (e.g., a wake word or phrase) is detected, a corresponding command or request may be ignored, for example. A sound profile, for example, may correspond to a frequency and temporal decomposition of a particular audio file or audio portion of any media file, such as an audio fingerprint or spectral representation.

The wake word detection system may include an expression detector that analyzes an audio signal produced by the microphone(s) to detect a wake word, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by the microphone(s). Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wake word is represented within the audio signal detected by the microphone(s). The expression detector may then compare that score to a wake word threshold to determine whether the wake word will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wake word). Upon declaring that the audio signal represents an utterance of the trigger expression, the device 1590 may then begin transmitting the audio signal to the language processing system 1550 for detecting and responds to subsequent utterances made by an individual.

In some embodiments, the storage/memory may store voice biometric data associated with one or more individuals. For example, an individual that operates the device 1590 may have a registered user account on the computer system 1500 (e.g., within accounts system 1568). In some embodiments, the device 1590 may be associated with a group account, and various individuals may have user accounts that are operating under the rules and configurations of the group account. As an illustrative example, an initiating device 1590 may be associated with a first group account on the computer system 1500, the first group account being for a family that lives at a household where first shared electronic device is located. Each family member may also have a user account that is linked to the first group account (e.g., a parent, a child, etc.), and therefore each user account may obtain some or all of the rights of the first group account. For example, the device 1590 may have a first group account on the computer system 1500 registered to a particular family or group, and each of the parents and children of the family may have their own user account associated with the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Upon receiving audio data representing an utterance, a voice print of that audio data may be generated using speaker identification functionality stored within the storage/memory. The voice print of the utterance may indicate the different frequency components of the spoken words over time as the utterance was spoken. The generated voice print may then be compared to a previously generated voice print, which may be referred to as a reference voice print, specific to a particular individual's speech. A difference between the generated voice print and the reference voice print may be determined and, if the difference is less than or equal to a predefined threshold value, then the two voice prints may be declared as corresponding to a same individual's voice indicating that that individual spoke the utterance. If the difference is larger than the predefined threshold value, then the generated voice print may be said to be unassociated with the individual's voice, and therefore may indicate that the individual did not speak the utterance. In some embodiments, the speaker identification functionality may compare any generated voice print to one or more reference voice prints in order to try and find a match. Therefore, for each individual's user account associated with a group account, voice biometric data (e.g., a voice print) for that particular individual may be included. This may allow device 1590 to attempt and identify a speaker of a particular utterance locally. However, persons of ordinary skill in the art will recognize that the device 1590 may not perform speaker identification processing, and alternatively speaker identification processing may be performed by the computer system 1500 (e.g., a speaker identification system 1570), or no speaker identification processing may be performed all together.

The communications circuitry of the device 1590 may include any circuitry allowing or enabling one or more components of the device 1590 to communicate with one another, or with one or more additional devices, servers, and/or systems. For example, the communications circuitry may facilitate communications between the device 1590 and the computer system 1500. As an illustrative example, audio data representing an utterance may be transmitted over the network(s) 1530, such as the Internet, to the computer system 1500 using any number of communications protocols. For example, the network(s) 1530 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between the device 1590 and the computer system 1500. In some embodiments, the device 1590 and computer system 1500 and/or one or more additional devices or systems (e.g., the language processing system 1550) may communicate with one another via a web browser using HTTP. Various additional communication protocols may be used to facilitate communications between the device 1590 and computer system 1500, including, but not limited to, Wi-Fi (e.g., 802.11 protocol), Bluetooth, radio frequency systems (e.g., 900 MHz, 1.4 GHz, and 5.6 GHz communications systems), cellular networks (e.g., GSM, AMPS, GPRS, CDMA, EV-DO, EDGE, 15GSM, DECT, IS-136/TDMA, iDen, LTE or any other suitable cellular network protocol), infrared, BitTorrent, FTP, RTP, RTSP, SSH, and/or VOIP.

The communications circuitry may use any communications protocol, such as any of the previously mentioned exemplary communications protocols. In some embodiments, the device 1590 may include an antenna to facilitate wireless communications with a network using various wireless technologies (e.g., Wi-Fi, Bluetooth, radiofrequency, etc.). In yet another embodiment, the device 1590 may include one or more universal serial bus ("USB") ports, one or more Ethernet or broadband ports, and/or any other type of hardwire access port so that the communications circuitry allows the device 1590 to communicate with one or more communications networks.

The device 1590 may also include one or more microphones and/or transducers. Furthermore, one or more microphones located within a separate device may be in communication with the device 1590 to capture sounds for the device 1590. The microphone(s) may be any suitable component capable of detecting audio signals. For example, the microphone(s) may include one or more sensors for generating electrical signals and circuitry capable of processing the generated electrical signals. In some embodiments, the microphone(s) may include multiple microphones capable of detecting various frequency levels. As an illustrative example, the device 1590 may include multiple microphones (e.g., four, seven, ten, etc.) placed at various positions about the device 1590 to monitor/capture any audio outputted in the environment where the device 1590 is located. The various microphones may include some microphones optimized for distant sounds, while some microphones may be optimized for sounds occurring within a close range of the device 1590. In some embodiments, the microphone(s) may only begin to detect audio signals in response to a manual input to device 1590. For example, a manually activated device may begin to capture audio data using the microphone(s) in response to a user input, such as pressing a button, tapping a touch screen, or providing any touch input gesture to a touch input component.

The device 1590 may be associated one or more speakers. Furthermore, the device 1590 may be in communication with one or more speaker(s). The speaker(s) may correspond to any suitable mechanism for outputting audio signals. For example, the speaker(s) may include one or more speaker units, speaker housings, transducers, arrays of speakers, and/or arrays of transducers that may be capable of broadcasting audio signals and or audio content to a surrounding area where device 1590 may be located. In some embodiments, the speaker(s) may include headphones or ear buds, which may be wirelessly wired, or hard-wired, to the device 1590, that may be capable of broadcasting audio directly to an individual.

In some embodiments, the one or more microphones may serve as input devices to receive audio inputs. The device 1590, in the previously mentioned embodiment, may then also include the one or more speakers to output audible responses. In this manner, the device 1590 may function solely through speech or audio, without the need for any input mechanisms or displays, however this is merely exemplary.

The device 1590 may also be associated with a display screen that may correspond to a display device and/or touch screen, which may be any size and/or shape and may be located at any portion of the device 1590. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, the display screen may correspond to a projected capacitive touch ("PCT"), screen include one or more row traces and/or driving line traces, as well as one or more column traces and/or sensing lines. In some embodiments, the display screen may be an optional component for the device 1590. For instance, the device 1590 may not include the display screen. Such devices, sometimes referred to as "headless" devices, may output audio, or may be in communication with a display device for outputting viewable content.

The display screen, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of the display screen, a capacitance between the object and the conductive material may be formed. The processor(s) may be capable of determining a location of the touch screen associated with where the capacitance change is detected and may register a touch input as occurring at that location.

In some embodiments, the display screen may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on the display screen corresponding to where a conductive object contacted display screen.

A change in capacitance may be measured to determine a location on the touch screen where the object has contacted the surface. For example, if an individual touches a point on display screen, then a corresponding driving line and sensing line that intersect at that point may be identified. A location of the point may have one or more pixels associated with that location, and therefore one or more actions may be registered for an item or items that are displayed at that location. The processor(s) of the device 1590 may be configured to determine which pixels are associated with a particular location point, and which item or items are also displayed at that pixel location. Furthermore, the device 1590 may be configured to cause one or more additional actions to occur to the item or items being displayed on the display screen based on a temporal duration the touch input, and or if one or more additional touch inputs are detected. For example, an object that contacted display screen at a first location may be determined, at a later point in time, to contact the display screen at a second location. In the illustrative example, an object may have initially contacted display screen at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen having 100 driving lines and 100 sensing lines may have 100 intersection points, and therefore 100 individual capacitors, while a touch screen display screen having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by the device 1590, and therefore the fewer driving lines and/or sensing lines used, the smaller the amount of power that is needed to operate the touch screen display.

In some embodiments, the display screen may correspond to a high-definition ("HD") display. For example, the display screen may display images and/or videos of 720p, 1080p, 1080i, or any other image resolution. In these particular scenarios, the display screen may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 15,073,600 pixels. However, persons of ordinary skill in the art will recognize that the aforementioned display ratios and pixel numbers are merely exemplary, and any suitable display resolution or pixel number may be employed for the display screen, such as non-HD displays, 4K displays, and/or ultra-displays.

In some embodiments, the device 1590 may be associated with one or more cameras, corresponding to any suitable image capturing component or components capable of capturing one or more images and/or videos. The camera(s) may, in some embodiments, be configured to capture photographs, sequences of photographs, rapid shots (e.g., multiple photographs captured sequentially during a relatively small temporal duration), videos, or any other type of image, or any combination thereof. In some embodiments, the device 1590 may include multiple cameras, such as one or more front-facing cameras and/or one or more rear facing cameras. Furthermore, the camera(s) may be configured to recognize far-field imagery (e.g., objects located at a large distance away from the device 1590) or near-filed imagery (e.g., objected located at a relatively small distance from the device 1590). In some embodiments, the camera(s) may be high-definition ("HD") cameras, capable of obtaining images and/or videos at a substantially large resolution (e.g., 726p, 1080p, 1080i, etc.). In some embodiments, the camera(s) may be optional for the device 1590. For instance, the camera(s) may be external to, and in communication with, the device 1590. For example, an external camera may be capable of capturing images and/or video, which may then be provided to the device 1590 for viewing and/or processing.

Persons of ordinary skill in the art will recognize that, in some embodiments, the display screen and/or camera(s) may be optional for the device 1590. For instance, the device 1590 may function using audio inputs and outputting audio, and therefore the display screen and/or camera(s) may not be included. Furthermore, in some embodiments, the device 1590 may not include the display screen and/or camera(s), but instead may be in communication with the display screen and/or camera(s). For example, the device 1590 may be connected to a display screen via a Wi-Fi (e.g., 802.11 protocol) connection such that visual content sent to the device 1590 may be sent to the display screen, and output thereby.

In some exemplary embodiments, the device 1590 may include an additional input/output ("I/O") interface. For example, the device 1590 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of the device 1590 may include one or more lights, light emitting diodes ("LEDs"), or other visual indicator(s). Persons of ordinary skill in the art will recognize that, in some embodiments, one or more features of the output portion of the I/O interface may be included in a purely voice activated version of the device 1590. For example, one or more LED lights may be included on the device 1590 such that, when the microphone(s) receive audio, the one or more LED lights become illuminated signifying that audio has been received by the device 1590. In some embodiments, one or more vibrating mechanisms or other haptic features may be included with the device 1590 to provide a haptic response to an individual.

In some embodiments, the device 1590 may include radio-frequency identification ("RFID") functionality and/or near field communication ("NFC") functionality. Furthermore, in some embodiments, the device 1590 may include one or more infrared ("IR") sensors and one or more IR emitters. The IR sensors/emitters may be used to determine depth information. For example, in one embodiment, a distance of an individual from the device 1590 may be determined using the one or more IR sensors/emitters. Depth determination may be performed using any depth determination technique. In some embodiments, a distance between an individual and the device 1590 may be employed as a basis for presenting content with varying density using the display screen. For example, when an individual is at a distance A from the device 1590, the device 1590 may display weather data for a current day. However as the user moves closer to the device 1590, such as at a distance B from the device 1590, which may be less than distance A, the device 1590 may display weather data for a current week. For instance, as the individual gets closer to the device 1590, the ability of the individual to see denser content increases, and as the individual moves father away from the device 1590, the individual's ability to see denser content decreases. This, for example, may ensure that the content displayed by the device 1590 is continually relevant and readable by the individual.

The computer system 1500, in non-limiting, exemplary embodiments, may include the language processing system 1550. However, in other embodiments, the language processing system 1550 may be separate from, or in communication with, the computer system 1500. Generally, the language processing system 1550 may, in some embodiments, include one or more remote devices capable of receiving and sending content from/to one or more electronic device, such as the device 1590. The language processing system 1550 may include various components and systems including, but not limited to, automatic speech recognition ("ASR") system 1558, natural language understanding ("NLU") system 1560, functionalities system 1562, text-to-speech ("TTS") system 1564, and accounts system 1568. In some embodiments, language processing system 1550 may also include computer readable media, including, but not limited to, flash memory, random access memory ("RAM"), and/or read-only memory ("ROM"). The language processing system 1550 may also include various systems that store software, hardware, logic, instructions, and/or commands for the language processing system 1550, such as a speaker identification ("ID") system 1570, or any other system, or any combination thereof.

The ASR system 1558 may be configured to recognize human speech in audio signals received from the device 1590, such as audio captured by the microphone(s), which may then be transmitted to the language processing system 1550. The ASR system 1558 may include, in some embodiments, one or more processor(s) 1552, storage/memory 1554, and communications circuitry 1556. The processor(s) 1552, storage/memory 1554, and communications circuitry 1556 may, in some embodiments, be substantially similar to the processor(s), storage/memory, and communications circuitry, which are described in greater detail above, and the aforementioned descriptions may apply. In some embodiments, the ASR system 1558 may include speech-to-text ("STT") system 1564. The STT system 1564 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

The ASR system 1558 may include an expression detector that analyzes audio signals received by the language processing system 1550, such as the expression detector mentioned above with regards to the device 1590. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wake word or phrase, is represented within the audio signal. The expression detector may then compare that score to a threshold value to determine whether the wake word or phrase will be declared as having been spoken.

The NLU system 1560 may be configured such that it determines user intent based on the text data is receives from the ASR system 1558. For example, the NLU system 1560 may determine that the intent of utterance is for initiating a communications session with a device, associated with a particular name (e.g., initiate a communications session with "Alice"). In response to determining the intent of the utterance, the NLU system 1560 may communicate the received command to an appropriate subject matter server or skill on the functionalities system 1562 to perform one or more tasks, and/or retrieve an appropriate response or response information. The NLU system 1560 may include processor(s) 1552, storage/memory 1554, and communications circuitry 1556 which, in one embodiment, may be substantially similar to the processor(s), storage/memory, and communications circuitry of the device 1590, and the previous description may apply.

The functionalities system 1562 (also referred to as speechlets module 1562) may, for example, correspond to various action specific systems or servers, sometimes referred to as "skills," capable of processing various task specific actions. The functionalities system 1562 may further correspond to first party applications and/or third party applications capable of performing various tasks or actions. For example, based on the context of the audio data received from the device 1590, the language processing system 1550 may use a certain functionality to generate a response, or to obtain response information, which in turn may be communicated back to the device 1590. For instance, an utterance may ask for weather information, and therefore the functionalities system 1562 may access a weather application to obtain current weather information for a location associated with the device 1590. The functionalities system 1562 may also include processor(s) 1552, storage/memory 1554, and communications circuitry 1556.

The TTS system 1564 may employ various text-to-speech techniques. However, techniques for transcribing text into speech are well known in the art and need not be described in further detail herein, any suitable computer implemented text to speech technique may be used to convert the output text into audio signal(s) into text, such as SOFTSOUND speech processing technologies available from the Autonomy Corporation, which is headquartered in Cambridge, England, United Kingdom. The TTS system 1564 may also include processor(s) 1552, storage/memory 1554, and communications circuitry 1556.

The accounts system 1568 may store one or more user accounts corresponding to users having a registered account on the computer system 1500. For example, a parent may have a registered account on the computer system 1500, and each of the parent's children may have their own user account registered under the parent's registered account. The accounts system 1568 may also store one or more group accounts corresponding to one or more shared devices. For example, a shared device, such as shared the device 1590, may have its own group account stored on the accounts system 1568. The group account may be associated with the shared device and may also be linked to one or more individual's user accounts. For example, the shared device 1590 may be associated with a first group account corresponding to a first grouping of individual (e.g., a family). One or more user accounts may also be associated with the first group account (e.g., individual members of the family), corresponding to individuals that may be capable of interacting with the shared device 1590. Information, permissions (e.g., for Drop Ins), settings, and/or preferences, for example, for each user account may be stored within a user account database. In some embodiments, the accounts system 1568 may store a voice signal, such as voice biometric information, for a specific user account. This may allow speaker identification techniques to be used to match a voice-to-voice biometric data associated with a specific user account. In some embodiments, the accounts system 1568 may store a telephone number assigned to a particular user account, a device identifier associated with a particular device, a communications identifier associated with a particular user account and/or group account, or any other suitable information, or any combination thereof.

It should also be recognized that although each of the ASR system 1558, NLU system 1560, subject matter/skills system 1562, TTS system 1564, and accounts system 1568 may each include instances of the processor(s) 1552, storage/ memory 1554, and communications circuitry 1556, and those instances of processor(s) 1552, storage/memory 1554, and communications circuitry 1556 within each of the ASR system 1558, NLU system 1560, functionalities system 1562, TTS system 1564, and accounts system 1568 may differ. For example, the structure, functionality, and style of the processor(s) 1552 within ASR system 1558 may be substantially similar to the structure, functionality, and style of the processor(s) 1552 within NLU system 1560, however the actual processor(s) 1552 need not be the same entity.

The computer system 1500 may also include, in a non-limiting embodiment, a communications system 1540, which may be configured to facilitate communications between two or more computing devices 1590. The communications system 1450 is an example of the communications system 111 of FIG. 1. For example, the communications system 1540 may be capable of facilitating a communications session between an initiating computing device and a recipient computing device and may include one or more calling agents and gateways nodes for communications session over PSTV or other types of communications network systems. Upon the language processing system 1550 determining that an intent of an utterance is for a communications session to be established between the device 1590 and another device, the device 1590 may access the communications system 1540 to facilitate the communications session. For example, the communications system 1540 may employ VoIP functionality to facilitate audio, video, and/or text data communications between the initiating computing device and the recipient computing device.

As an illustrative example, a communications session between two devices is described below to illustrate how the communications session may be established. In one example embodiment, an individual (e.g., a caller) may speak an utterance (e.g., "Alexa, send a message to Alice: 'Want to have dinner at my place?'") to their device 1590 (e.g., the initiating computing device 210). In response to detecting the device's wake word (e.g., "Alexa"), the device 1590 may begin sending audio data representing the utterance to the computer system 1500, and in particular to the language processing system 1550. Upon receipt, the ASR system 1558 may perform speech recognition processing, such as speech-to-text processing, to the audio data to generate text data representing the audio data. The text data may then be passed to the NLU system 1560 to determine the intent of the utterance. For example, the NLU system 1560 may include a listing of sample utterances to be used to disambiguate the spoken words and determine an action intended to occur for the utterance. In some embodiments, a messaging speechlet system may be included within the NLU system 1560 that includes one or more sample utterance frameworks. If the format of the spoken utterance substantially matches one of these sample utterances, then that may indicate that the intent of the utterance was for a communications session to be initiated. For instance, one sample utterance may be "{Wake word}, send a message to {Contact Name}: {Message}." If the framework of the spoken utterance's text data substantially matches this sample utterance framework, the NLU system 1560 may determine that the intent of the utterance was to start a communications session with a contact of the user, and NLU may also determine that the intended target of the communications session is "Alice" (e.g., {Contact Name}: Alice). After determining that a message is to be sent to a contact named "Alice," the communications system 1540 may rely on a contact services system 1528 that accesses the accounts system 1568 determines whether any device identifiers (e.g., a device address) are associated with the contact, "Alice." If multiple devices are determined, the communications system 1540 may access a preferences system 1524 that stores preferences of the contact for using the different devices and a contact presence monitoring system 1544 that detects the presence of the contact relative to these devices and provides proximity information. The communications system 1540 identifies a particular device or a particular subset of the devices that communications with which the communications can be initiated. Similarly, if an inbound communications request is associated with a user account that stores multiple device identifiers, a subset or all of the computing devices can be rung.

In some embodiments, the communications system 1540 may establish a communications session between an initiating device 1590 and a recipient device 1590 using one or more VoIP protocols including, but not limited to SIP, RTP, RTCP, SRTP, and SDP or other communication protocols implemented by a communications routing service 1526. In one illustrative embodiment, a SIP signaling command may be provided to the communications system 1540 for communicating with the recipient device. In particular, PJSIP functionality adds a new "user-to-user" header that indicates the device pair for the communications session.

In some embodiments, the communications system 1540 may include a communication rules engine 1542 that may store various rules for how certain communications between group accounts and user accounts are to behave and that may store device information for different computing devices. For example, the communications rules engine 1542 may store communications routing information and instructions for how different messages may be sent from one device to another device depending on a variety of parameters including, but not limited to, if the sender device is a shared device, if the recipient device is a shared device, if the sender device is a personal device, if the recipient device is a personal device, if there are any personal and/or shared devices associated with the sender device and/or recipient device, and/or whether or not speaker identification was able to positively identify a speaker. Other parameters relate to the device information, such as device type identifier, software version, and status. In some illustrative embodiments, the communication rules engine 1542 may store a communications table indicating various device identifiers, group account identifiers, communication identifiers, and device types for various devices interacting with the communications system. In addition, the communication rules engine 1542 may generate content, such as TTS audio, based on an identifier of the device 1590, where this content can identify a party initiating a communications session (e.g., the caller and/or the device 1590).

In some embodiments, the communications system 1540 may also include a message data store that may correspond to any suitable type of storage/memory, such as that of the storage/memory, 1554, that is capable of storing one or more messages sent/received, including the content about the initiating party. For example, when an individual sends a message (e.g., "Want to have dinner at my place?") from their shared electronic device to another shared electronic device, that message may be stored by the communications system using the message data store. In some embodiments, the message data store may be structured to store audio data representing audio message, video data representing video messages, image data representing image messages, text data representing text messages, and/or message notification metadata. When an individual utters a request to receive messages received for their user account and/or group account, the communications system 1540 may access the message data store to obtain those messages, and may send the appropriate message data (e.g., audio, video, image, text, etc.) to the corresponding requesting device (e.g., personal device, shared device).

In some embodiments, the message data store may store each message with a corresponding communications identifier, group account identifier, user account identifier, and/or device identifier with which that message is directed to. For example, if a first individual sends an audio message to a second individual, audio data representing that audio message may be stored by the message data store with a group account identifier associated with the second individual's corresponding group account, as stored by accounts system 1568. This way, when an individual requests to receive messages associated with their group account, the message data store may be accessed to obtain any messages currently stored thereby that are associated with that group account's group account identifier.

The computer system 1500 may also include, in some embodiments, a speaker identification system 1570 that may correspond to any suitable device/system capable of identifying a particular person's voice from an audio signal. The speaker identification system 1570 may determine whether a current voice being used to speak matches known voice biometric data associated with a particular individual's voice. In some embodiments, voice biometric data may be stored within the accounts system 1568 for various individuals having a user account stored thereby. For example, the caller may have a user account on the computer system 1500 (e.g., stored within the accounts system 1568), which may be associated with the initiating device 210. Stored within that user account may be voice biometric data associated with a voice profile for the caller. Therefore, when an utterance is detected, and subsequently when audio data representing that utterance is received by the computer system 1500, the speaker identification system 1570 may determine whether the voice that spoke utterance matches, to at least a predefined confidence level, the stored voice biometric information associated with the caller stored by their user account. If so, then this may indicate that the caller is the likely speaker of the utterance.

The communications rules engine 1542 may employ several communications rules for messages sent/received to/from one or more participants. First, a device type of the sending device may be determined. For example, a determination may be made as to whether or not a device identifier associated with the device that the audio data representing the utterance, which include a message to be sent to another individual's device, is associated with a shared device. Next, a determination may be made by the speaker identification system 1570 as to whether or not a speaker that spoke the utterance was identified. Using these two parameters, for instance, the communications rules engine 1542 may be configured to cause the communications system 1540 to facilitate communications between two or more devices.

Figure 16:
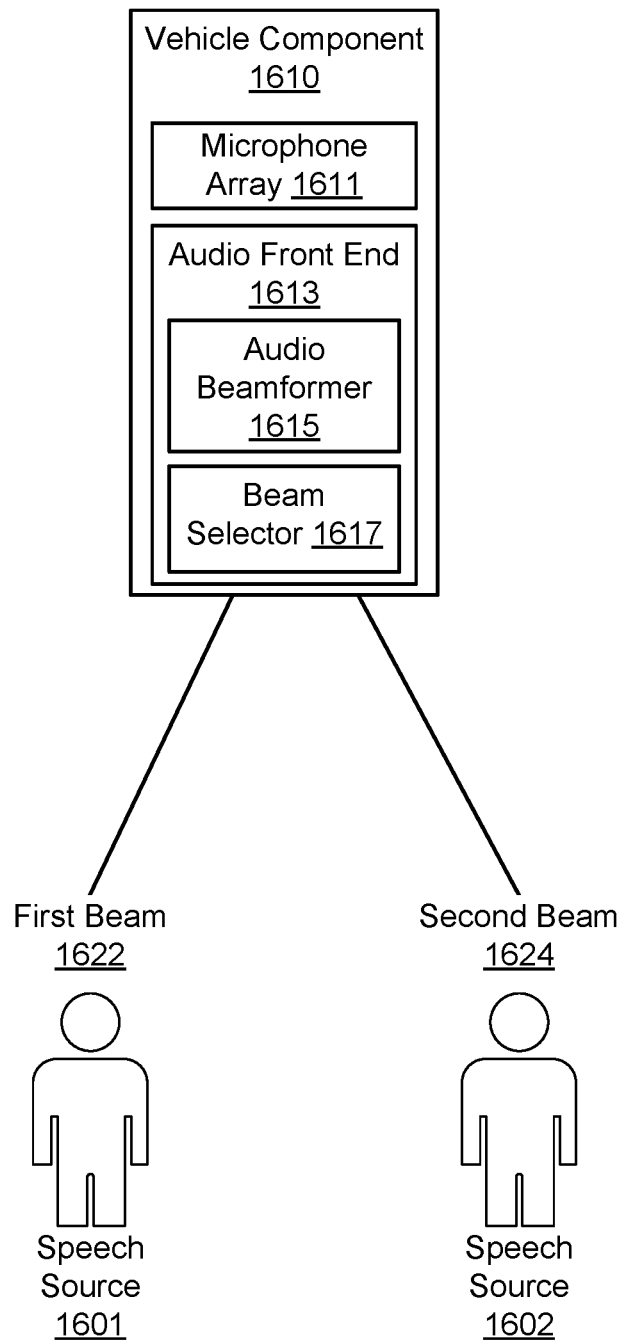
FIG. 16 illustrates an example of audio beamforming, according to embodiments of the present disclosure.

FIG. 16 illustrates an example of audio beamforming, according to embodiments of the present disclosure. The audio beamforming can be performed by a vehicle component 1610, which correspond to a combination of the audio processing circuitry 420 and the microphones 416 of FIG. 4.

In an example, the vehicle component 1610 includes a microphone array 1611 (e.g., the microphones 416) that detects audio and generates audio signals that represent the audio. The vehicle component 1610 also includes an audio front end 1613 (e.g., a component of the audio processing circuitry 420, such as the audio DSP 510 of FIG. 5) that receives and processes the audio signals to generate audio data 1612 that represents the audio. In particular, the audio front end 1613 includes an audio beamformer 1615 and a beam selector 1617. The audio beamformer 1615 enhances an audio signal from a direction while suppressing audio signals from other directions to generate an enhanced audio signal per direction, which can be referred as a beam or, equivalently, an audio beam. In turn, the beam selector 1617 selects a beam (e.g., one of the enhanced audio signals). The audio front 1613 can generate and output audio data that represents this beam. The audio front end 1613 can store zone configuration data indicating a direction for each zone and associating the direction with a zone identifier. Based on the direction of the selected beam and the zone configuration data, the audio front end 1613 associated the audio data with a zone identifier (e.g., by including the zone identifier in metadata data of the audio data).

The microphone array 1611 can include a plurality of microphones that are spaced from each other in a known or predetermined configuration (e.g., within a vehicle). For instance, the microphone array 1611 may be a two-dimensional array, wherein the microphones are positioned within a single plane. In another illustration, the microphone array 1611 may be a three-dimensional array, in which the microphones are positioned in multiple planes. The number of microphones can depend on the type of the vehicle component 1610. Generally, accuracy and resolution of audio beamforming may be improved by using higher numbers of microphones.

The audio beamformer 1615 may use signal processing techniques to combine signals from the different microphones of the microphone array 1611 so that audio signals originating from a particular direction are enhanced while audio signals from other directions are deemphasized. For instance, the audio signal signals from the different microphones are phase-shifted by different amounts so that audio signals from a particular direction interfere constructively, while audio signals from other directions experience interfere destructively. The phase shifting parameters used in beamforming may be varied to dynamically select different directions. Additionally, or alternatively, differences in audio arrival times at different microphones of the microphone array 1611 can be used. Differences in arrival times of audio at the different microphones are determined and then analyzed based on the known propagation speed of sound to determine a point from which the sound originated. This process involves first determining differences in arrivals times using signal correlation techniques between the audio signals of the different microphones, and then using the time-of-arrival differences as the basis for sound localization.

The beam selector 1617 can receive the enhanced audio signals (e.g., the beams) and can perform measurements on such signals. The measurements can use a reference audio signal, such as an audio signal of one of the microphones of the microphone array 1611, or multiple reference audio signals, such as the audio signal of each microphone of the microphone array 1611. The measurement on an enhanced audio signal can include determining a property of this signal, such as the signal-to-noise (SNR) ratio or signal-to-interference (SIR) ratio. Generally, the beam selector 1617 selects the enhanced audio signal that has the best measurement (e.g., the largest SNR or the largest SIR).

The audio processing of the audio front end 1613, including the audio beamformer 1615 and the beam selector 1617 can be performed in the analog domain and/or the digital domain. Some of the operations further include noise cancelation, signal filtering, and other audio processing techniques.

In the illustrative example of FIG. 16, a speech source 1601 (e.g., a first passenger) is present in proximity of the vehicle component 1610 (e.g., by being in the vehicle). Proximity refers to the vehicle component 1610 being capable of detecting noise audio generated by the speech source 1601. Upon speech audio from the speech source 1601, the audio front end 1613 may select a beam having a direction towards the speech source 1601. This beam is shown in FIG. 16 as a first beam 1622 and corresponds to an enhanced audio signal that is determined from the audio signals generated by the microphones of the microphone array 1611 and that is associated with the direction towards the speech source 1601.

Subsequently, the vehicle component 1610 detects speech audio from a second speech source 1602 (e.g., a first passenger). Depending on characteristics of this audio, the audio front end 1613 can determine that this second audio corresponds to noise or to speech input corresponding to a second beam 1602. In an example, the characteristics correspond to noise characteristics (e.g., RSSI is lower than a threshold value). In this case, the audio front end 1613 can suppress this speech audio by performing noise cancellation operations thereon. In another example, the characteristics indicate speech input (e.g., the RSSI being larger than the threshold value and/or similar to the RSSI of the first beam 1622). In this case, the second beam 1624 is selected. Zone interference cancellation can be performed in the time domain or the frequency domain, whereby the first beam 1622 can be filtered out from the second beam 1624 and vice versa. Generally, the utterance audio is louder than the noise audio.

In various embodiments of the present disclosure, a user has control over user-related information that can be collected and analyzed. Depending on the type of user-related information, appropriate measures are taken to ensure protection of this information, to empower the users to determine what data can be collected and analyzed, as well as empower the users to indicate which portions of the information should be deleted and/or no longer collected and/or analyzed. Further, the user has control over opting into the communications services described herein and, if opted in, to opt out at any time. The features provided by the communication services are compliant with the applicable regulations.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A vehicle system comprising:
   a first speaker associated with a first zone identifier of a vehicle;
   a first display associated with the first zone identifier;
   a second speaker associated with a second zone identifier of the vehicle;
   a second display associated with the second zone identifier;
   a set of microphones installed in the vehicle;
   one or more processors; and
   one or more memory storing instructions that, upon execution by the one or more processors, configure the vehicle system to:
   establish a data connection with a first device located in the vehicle;

store first data indicating that the first speaker, the first display, and the first device are associated with the first zone identifier;

store second data indicating that the second speaker and the second display are associated with the second zone identifier;

determine that a communications session is established between the first device and a second device outside of the vehicle;

receive user input data indicating that the communications session is to be associated with the first zone identifier and the second zone identifier;

store third data indicating that a session identifier of the communications session is associated with the first zone identifier and the second zone identifier;

receive, from the second device, incoming audio data associated with the communications session;

receive, from the set of microphones, first outgoing audio data associated with the first zone identifier;

receive, from the set of microphones, second outgoing audio data associated with the second zone identifier;

generate first audio data by at least multiplexing the incoming audio data and the second outgoing audio data to generate first multiplexed audio data and encoding the first multiplexed audio data;

cause the first speaker to output the first audio data;

generate second audio data by at least multiplexing the incoming audio data and the first outgoing audio data to generate second multiplexed audio data and encoding the second multiplexed audio data;

cause the second speaker to output the second audio data;

generate third outgoing audio data by at least multiplexing the first outgoing audio data and the second outgoing audio data to generate third multiplexed audio data and encoding the third multiplexed audio data; and send the third outgoing audio data to the first device.

2. The vehicle system of claim 1, wherein the one or more memory store further instructions that, upon execution by the one or more processors, configure the system to:

receive, from the second device, fourth data indicating a request to establish communications with the first device;

cause the first display to output a first graphical user interface including a first graphical user interface component and a second graphical user interface component, the first graphical user interface component indicating the request, the second graphical user interface component indicating an option to associate the second zone identifier with the communications session, wherein the user input data indicates a selection of the option;

generate the third data by at least determining that the user input data indicates the selection; and cause the second display to output a second graphical user interface indicating that the first zone identifier associated the second zone identifier with the communications session.

3. The vehicle system of claim 1, wherein the one or more memory store further instructions that, upon execution by the one or more processors, configure the system to:

store, prior to receiving the user input data, fourth data indicating a status associated with the second zone identifier, the status indicating that no ongoing communications session is associated with the second zone identifier;

determine, from the user input data, a request to associate the second zone identifier with the communications session; and determine that the first zone identifier is permitted to associate the second zone identifier with the communications session by at least looking up of the fourth data and determining the status.

4. A method implemented by a system, the method comprising:

storing first data indicating that a first speaker and a first display are associated with a first zone identifier;

storing second data indicating that a second speaker and a second display are associated with a second zone identifier;

associating the first zone identifier with a communications session established with a device;

receiving input data associated with the first zone identifier, the input data indicating a request to associate the second zone identifier with the communications session;

associating the second zone identifier with the communications session;

receiving incoming audio data of the communications session;

receiving first outgoing audio data of the communications session, the first outgoing data associated with the first zone identifier;

receiving second outgoing audio data of the communications session, the second outgoing audio data associated with the second zone identifier;

generating first audio data by at least mixing the incoming audio data and the second outgoing audio data;

causing the first speaker to output the first audio data;

generating third outgoing audio data by at least mixing the first outgoing audio data and the second outgoing audio data; and sending the third outgoing audio data.

5. The method of claim 4 further comprising:

storing fourth data associating the first zone identifier with a set of permissions;

determining, prior to receiving the input data, that the fourth data indicates that the first zone identifier is permitted to associate the second zone identifier with the communications session; and causing the first display to include, in a first graphical user interface, a graphical user interface component indicating an option to associate the second zone identifier with the communications session.

6. The method of claim 5 further comprising:

determining, based at least in part on input data, the request, wherein the input data includes a natural language utterance corresponding to audio associated with the first zone identifier; and generating second data based at least in part on the input data and the permission, the second data indicating that the first zone identifier and the second zone identifier are associated with the communications session.

7. The method of claim 4 further comprising:

determining, prior to associating the second zone identifier with the communications session, a status associated with the second zone identifier, the status indicating that no ongoing communications session is associated with the second zone identifier; and causing, based at least in part on the status, the first display to include, in a first graphical user interface, a graphical user interface component indicating an option to associate the second zone identifier with the communications session.

8. The method of claim 4 further comprising:
receiving, after the communications session is established, audio data corresponding to a natural language utterance indicating the request, wherein the input data includes the audio data.

9. The method of claim 8 further comprising:
determining that the audio data is associated with the first zone identifier; and
determining that the first zone identifier is associated with a permission to associate the second zone identifier with the communications session, wherein the second zone identifier is associated with the communications session based at least in part on the permission.

10. The method of claim 4 further comprising:
receiving additional input data associated with the first zone identifier and indicating a request to terminate the communications session, the additional input data corresponding to an interaction with a first graphical user interface presented by the first display or to a natural language utterance detected by a set of microphones;
determining that the first zone identifier is associated with a permission to terminate the communications session in association with the first zone identifier and the second zone identifier; and
terminating the communications session based at least in part on the permission.

11. The method of claim 4 further comprising:
receiving additional input data associated with the first zone identifier and indicating a request to terminate the communications session;
determining that the first zone identifier is associated with a permission to terminate the communications session in association with the first zone identifier only;
storing third data indicating that the second zone identifier and not the first zone identifier is associated with the communications session;
suppressing additional audio data associated with the first zone identifier; and
sending additional outgoing audio data associated with the second zone identifier.

12. The method of claim 4 further comprising:
determining that the first zone identifier is associated with a permission to perform an operation on the second outgoing audio data;
causing, based at least in part on the permission, the first display to include, in a first graphical user interface, a graphical user interface component indicating an option to request the operation;
receiving additional input data associated with the first zone identifier and indicating that the operation is requested; and
causing, based at least in part on the additional input data and the permission, the operation to be performed on the second outgoing audio data.

13. A system comprising:
one or more processors; and
one or more memory storing instructions that, upon execution by the one or more processors, configure the system to:
store first data indicating that a first speaker and a first display are associated with a first zone identifier;
store second data indicating that a second speaker and a second display are associated with a second zone identifier;
associate the first zone identifier with a communications session established with a device;
receive input data associated with the first zone identifier, the input data indicating a request to associate the second zone identifier with the communications session;
associate the second zone identifier with the communications session;
receive incoming audio data of the communications session;
receive first outgoing audio data of the communications session, the first outgoing data associated with the first zone identifier;
receive second outgoing audio data of the communications session, the second outgoing audio data associated with the second zone identifier;
generate first audio data by at least mixing the incoming audio data and the second outgoing audio data;
cause the first speaker to output the first audio data;
generate third outgoing audio data by at least mixing the first outgoing audio data and the second outgoing audio data; and
send the third outgoing audio data.

14. The system of claim 13, wherein the one or more memory store further instructions that, upon execution by the one or more processors, configure the system to:
determine a contacts list associated with the second zone identifier;
cause, prior to the communications session being established, the first display to include, in a first graphical user interface, a first graphical user interface component indicating an option to select a contact from the contacts list; and
receive additional input data associated with the first zone identifier and indicating a selection of the contact, wherein the communications session is established based at least in part on the additional input data.

15. The system of claim 13, wherein the one or more memory store further instructions that, upon execution by the one or more processors, configure the system to:
determine a contacts list associated with first zone identifier;
cause, prior to the communications session being established, the first display to include, in a first graphical user interface, a first graphical user interface component indicating an option to select a contact from the contacts list;
receive additional input data associated with the first zone identifier and indicating a selection of the contact, wherein the communications session is established based at least in part on the additional input data; and
cause the second display to present a second graphical user interface indicating the contact.

16. The system of claim 13, wherein the one or more memory store further instructions that, upon execution by the one or more processors, configure the system to:
determine a first contacts list associated with first zone identifier;
cause, prior to the communications session being established, the first display to include, in a first graphical user interface, a first graphical user interface component indicating an option to select a first contact from the first contacts list;
receive additional input data associated with the first zone identifier and indicating a selection of the first contact, wherein the communications session is established based at least in part on the additional input data;

determine a second contacts list associated with the second zone identifier;

determine that the second contacts list includes a second contact that corresponds to the first contact; and cause the second display to present a second graphical user interface indicating the second contact.

17. The system of claim 13, wherein the one or more memory store further instructions that, upon execution by the one or more processors, configure the system to:

cause the second display to present a graphical user interface indicating that the first zone identifier associated the second zone identifier with the communications session.

18. The system of claim 13, wherein the one or more memory store further instructions that, upon execution by the one or more processors, configure the system to:

receive additional input data associated with the first zone identifier and indicating a request to disassociate the second zone identifier and the communications session;

determine that the first zone identifier is associated with a permission to disassociate the second zone identifier and the communications session;

store second data indicating that the second zone identifier is no longer associated with the communications session;

suppress audio data associated with the second zone identifier; and send outgoing audio data associated with the first zone identifier.

19. The system of claim 13, wherein the one or more memory store further instructions that, upon execution by the one or more processors, configure the system to:

receive additional input data associated with the first zone identifier and indicating a request to mute audio associated with the second zone identifier;

determine that the first zone identifier is associated with a permission to mute the audio;

store second data indicating that additional audio data associated with the second zone identifier is to be suppressed;

suppress the additional audio data; and cause the second speaker to output additional incoming audio data.

20. The system of claim 13, wherein the one or more memory store further instructions that, upon execution by the one or more processors, configure the system to:

establish a data connection with a device, wherein the first data indicates that the device is associated with the first zone identifier; and cause the first display to include, in a first graphical user interface, a graphical user interface component indicating an option to associate the second zone identifier with the communications session, wherein the graphical user interface component is included based at least in part on a permission associated with the first zone identifier or a status associated with the second zone identifier, wherein the third outgoing audio data is sent to the device, and wherein the incoming audio data is received from the device.

* * * * *